(12) United States Patent
Morganstein et al.

(10) Patent No.: US 7,489,766 B2
(45) Date of Patent: *Feb. 10, 2009

(54) AUTHENTICATING A CALLER BEFORE PROVIDING THE CALLER WITH ACCESS TO ONE OR MORE SECURED RESOURCES

(75) Inventors: Sanford J. Morganstein, West Dundee, IL (US); Sergey Zaks, Chicago, IL (US)

(73) Assignee: Ochopee Big Cypress LLC, Los Altos, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 11/360,527

(22) Filed: Feb. 24, 2006

(65) Prior Publication Data

US 2006/0140386 A1    Jun. 29, 2006

Related U.S. Application Data

(63) Continuation of application No. 10/352,848, filed on Jan. 27, 2003, now Pat. No. 7,006,605, which is a continuation of application No. 09/799,977, filed on Mar. 2, 2001, now Pat. No. 6,526,126, which is a continuation of application No. 08/982,190, filed on Dec. 17, 1997, now Pat. No. 6,205,204, which is a continuation-in-part of application No. 08/918,937, filed on Aug. 25, 1997, now Pat. No. 6,529,881, and a continuation-in-part of application No. 08/819,482, filed on Mar. 17, 1997, now Pat. No. 5,901,203, and a continuation-in-part of application No. 08/672,677, filed on Jun. 28, 1996, now Pat. No. 5,940,476.

(51) Int. Cl.
*H04M 1/64* (2006.01)

(52) U.S. Cl. .............. 379/88.02; 379/88.03; 379/88.04; 379/88.19; 379/88.21; 379/93.03; 379/142.05

(58) Field of Classification Search ................ 379/67.1, 379/88.01–88.04, 88.19–88.21, 93.03, 127.02, 379/142.05, 201.11
See application file for complete search history.

(56) References Cited

U.S. PATENT DOCUMENTS 4,053,710 A    10/1977    Advani et al.
(Continued)

FOREIGN PATENT DOCUMENTS

JP          7-111535        4/1995
WO        WO 91/18386    11/1991

OTHER PUBLICATIONS

Unknown, "VoicePass 4000™, New Speaker Verification Evaluation Kit," Linkon Corporation, 5 pages, Copyright 1996.

(Continued)

*Primary Examiner*—MD S Elahee
(74) *Attorney, Agent, or Firm*—Sterne, Kessler, Goldstein & Fox, P.L.L.C.

(57) ABSTRACT

In one embodiment, a system authenticates a caller before providing the caller with access to one or more secured resources. Identification and verification data is stored during system enrollment of known persons. A processing system, in a current call initiated by a caller and prior to identification of the caller, receives voice-based information for the caller including a digital representation of a telephone number spoken by the caller in the current call, the received information including voice-based identification information and voice-based verification information for the caller. The processing system automatically compares the received identification information and the received verification information for the caller with the stored identification and verification data for known persons, respectively, to uniquely identify and verify the identity of the caller as a particular known person. The processing system authenticates the caller for access to the one or more secured resources in response.

24 Claims, 16 Drawing Sheets

U.S. PATENT DOCUMENTS

| | | | |
|---|---|---|---|
| 4,181,813 A | 1/1980 | Marley |
| RE32,012 E | 10/1985 | Pirz et al. |
| 4,696,028 A | 9/1987 | Morganstein et al. |
| 4,752,958 A | 6/1988 | Cavazza et al. |
| 4,817,129 A | 3/1989 | Riskin |
| 4,827,518 A | 5/1989 | Feustel et al. |
| 4,837,830 A | 6/1989 | Wrench, Jr. et al. |
| 4,876,717 A | 10/1989 | Barron et al. |
| 4,949,379 A | 8/1990 | Cordell |
| 4,961,229 A | 10/1990 | Takahashi |
| 4,993,068 A | 2/1991 | Piosenka et al. |
| 5,020,095 A | 5/1991 | Morganstein et al. |
| 5,054,083 A | 10/1991 | Naik et al. |
| 5,125,022 A | 6/1992 | Hunt et al. |
| 5,125,024 A | 6/1992 | Gokcen et al. |
| 5,127,043 A | 6/1992 | Hunt et al. |
| 5,136,633 A | 8/1992 | Tejada et al. |
| 5,153,918 A | 10/1992 | Tuai |
| 5,181,237 A | 1/1993 | Dowden et al. |
| 5,228,076 A | 7/1993 | Hopner et al. |
| 5,247,497 A | 9/1993 | Cohn |
| 5,265,191 A | 11/1993 | McNair |
| 5,274,695 A | 12/1993 | Green |
| 5,287,403 A | 2/1994 | Atkins et al. |
| 5,297,194 A | 3/1994 | Hunt et al. |
| 5,303,299 A | 4/1994 | Hunt et al. |
| 5,309,504 A | 5/1994 | Morganstein |
| 5,325,421 A | 6/1994 | Hou et al. |
| 5,327,486 A | 7/1994 | Wolff et al. |
| 5,339,361 A | 8/1994 | Schwalm et al. |
| 5,353,336 A | 10/1994 | Hou et al. |
| 5,365,574 A | 11/1994 | Hunt et al. |
| 5,384,833 A | 1/1995 | Cameron |
| 5,414,755 A | 5/1995 | Bahler et al. |
| 5,420,908 A | 5/1995 | Hodges et al. |
| 5,425,128 A | 6/1995 | Morrison |
| 5,454,063 A | 9/1995 | Rossides |
| 5,465,290 A | 11/1995 | Hampton et al. |
| 5,467,398 A | 11/1995 | Pierce et al. |
| 5,479,494 A | 12/1995 | Clitherow |
| 5,488,652 A | 1/1996 | Bielby et al. |
| 5,517,558 A | 5/1996 | Schalk |
| 5,553,119 A | 9/1996 | McAllister et al. |
| 5,557,658 A | 9/1996 | Gregorek et al. |
| 5,598,507 A | 1/1997 | Kimber et al. |
| 5,636,282 A | 6/1997 | Holmquist et al. |
| 5,638,425 A | 6/1997 | Meador, III et al. |
| 5,703,935 A | 12/1997 | Raissyan et al. |
| 5,704,009 A | 12/1997 | Cline et al. |
| 5,719,921 A | 2/1998 | Vysotsky et al. |
| 5,752,231 A | 5/1998 | Gammel et al. |
| 5,752,232 A | 5/1998 | Basore et al. |
| 5,758,322 A | 5/1998 | Rongley |
| 5,774,841 A | 6/1998 | Salazar et al. |
| 5,794,218 A | 8/1998 | Jennings et al. |
| 5,802,251 A | 9/1998 | Cohen et al. |
| 5,805,674 A | 9/1998 | Anderson, Jr. |
| 5,893,057 A | 4/1999 | Fujimoto et al. |
| 5,898,154 A | 4/1999 | Rosen |
| 5,901,203 A | 5/1999 | Morganstein et al. |
| 5,901,214 A | 5/1999 | Shaffer et al. |
| 5,940,476 A | 8/1999 | Morganstein et al. |
| 5,991,617 A | 11/1999 | Powell |
| 5,995,928 A | 11/1999 | Nguyen et al. |
| 6,205,204 B1 | 3/2001 | Morganstein et al. |
| 6,445,775 B1 | 9/2002 | Morganstein et al. |
| 6,456,698 B1 | 9/2002 | Morganstein et al. |
| 6,526,126 B1 | 2/2003 | Morganstein et al. |
| 6,529,881 B2 | 3/2003 | Morganstein et al. |
| 7,006,605 B1 | 2/2006 | Morganstein et al. |

OTHER PUBLICATIONS

Unknown, "T-NETIX SpeakEZ Voice Print$^{SM}$ Speaker Verification," Advanced Technology Solutions, 4 pages, undated.

Unknown, "T-NETIX Company Overview," Advanced technology Solutions, brochure, 4 pages, undated.

C. Graziano, "Technology uses 'voiceprints' to identify Web surfers," Reuters/Wired, 2 pages, Sep. 14 (year unknown).

B.S. Atal, "Automatic Recognition of Speakers from Their Voices," Reprinted from Proc. IEEE, vol. 64, pp. 460-475, 16 pages, Apr. 1976.

S. Furui, "Speaker-dependent-feature extraction, recognition and processing techniques," Speech Communication, 10:5-6, pp. 505-520, 1991.

M. Bimbaum, et al., "Report: A Voice Password System for Access Security," AT&T Technical Journal, pp. 68-74, Jul. 17, 1986.

Furui, et al., "ECSI Workshop on Automatic Speaker Recognition Identification Verification," ISSN: 1018-4554, Martigny, Switzerland, 249 pages, Apr. 5-7, 1994.

S.J. Morganstein, et al., "System and Method for Identifying a Caller," U.S. Appl. No. 10/232,347, now abandoned, filed Aug. 30, 2002.

S.J. Morganstein, et al., "System and Method for Identifying a Caller," U.S. Appl. No. 10/236,487, now abandoned, filed Sep. 6, 2002.

English language abstract of Japanese Patent Publication No. 7-111535, published Apr. 25, 1995, 1 page, printed from http://www.espacenet.com.

| 102 | 106 | 108 | 110 | 112 | 114 | 116 | 118 | 119 | 120 | 121 | |
|---|---|---|---|---|---|---|---|---|---|---|---|
| ACCOUNT ID | LAST NAME | GENDER | ADDRESS | RESIDENCE | COMMUNICATIONS | ORGANIZATION | SBU | PREMISES | CLEARANCE | HISTORY | ... |
| J4N055 | SMITH | M | 21 ELM | DALLAS | (214) 555-8675 | XYZ | 62 | 17 | — | HUGGIES | |
| T3Q864 | HILL | M | 3 MAPLE | DENVER | 555 | ACME | 13 | DENVER-2 | — | $1231.65 | |
| L2T475 | PARK | F | 54 OAK | MIAMI | PARK@ABC.COM | ABC | 32 | HHS-ELM | 7 | 12/2/96 | |
| ... | | | | | | | | | | | |

| 102 | 134 | 136 | 138 | 140 | 142 | 144 | 146 | |
|---|---|---|---|---|---|---|---|---|
| ACCOUNT ID | ORDER | DATE | PART | MANUFACTURER | SERIAL | PURCHASE | STATUS | ... |
| J4N055 | 3221 | 05/22/96 | 43NN | JONES, INC. | 339VM | $295.00 | C | |
| T3Q864 | 4784 | 05/25/96 | J37S | HARRIS, INC. | 4273XO | $17.00 | D | |
| T3Q864 | 4785 | 05/25/96 | XY;7P | AONE, INC.; XYZ | —;330TVN | $42.00; $1,312.00 | D | |
| L2T475 | 7263 | 06/01/96 | 3907 | AOK CO. | — | | O | |
| ... | | | | | | | | |

| ACCOUNT ID | UTTERANCE | PARAMETRIC ENCODING | LENGTH | PITCH | NAME | GENDER | |
|---|---|---|---|---|---|---|---|
| J4N055 | ***** | *** | 0.81 | 5123 | SMITH | M | o |
| J4N055 | ****** | *** | 0.82 | 5062 | SMITH | M | o |
| J4N055 | ***** | *** | 0.78 | 5221 | SMITH | M | o |
| T3Q864 | ****** | *** | 0.65 | 6755 | HILL | M | |
| T3Q864 | ****** | *** | 0.66 | 6602 | HILL | M | |
| L2T475 | ****** | *** | 0.32 | 9335 | PARK | F | |
| o | | | | | | | |

FIG. 3c

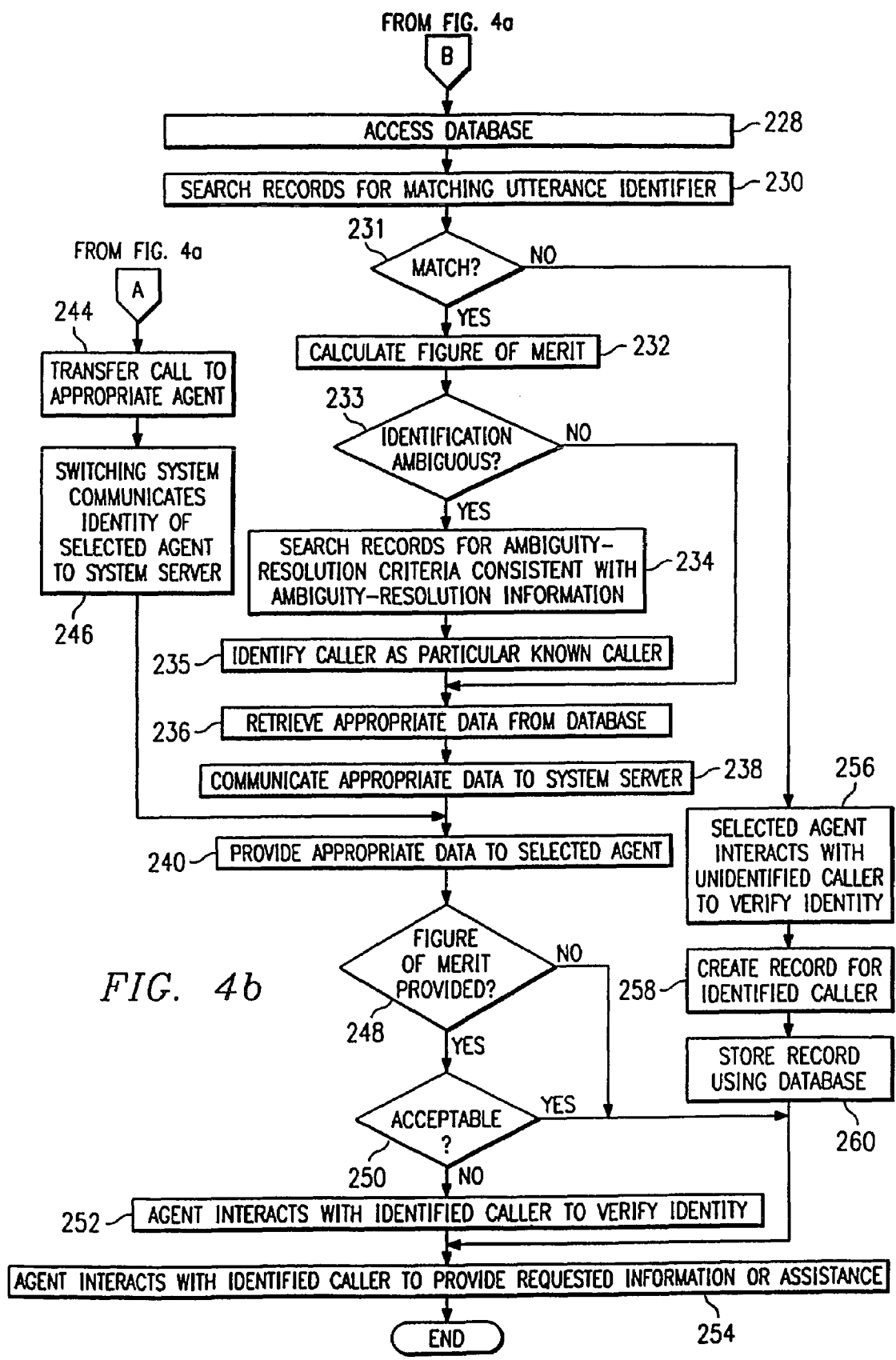

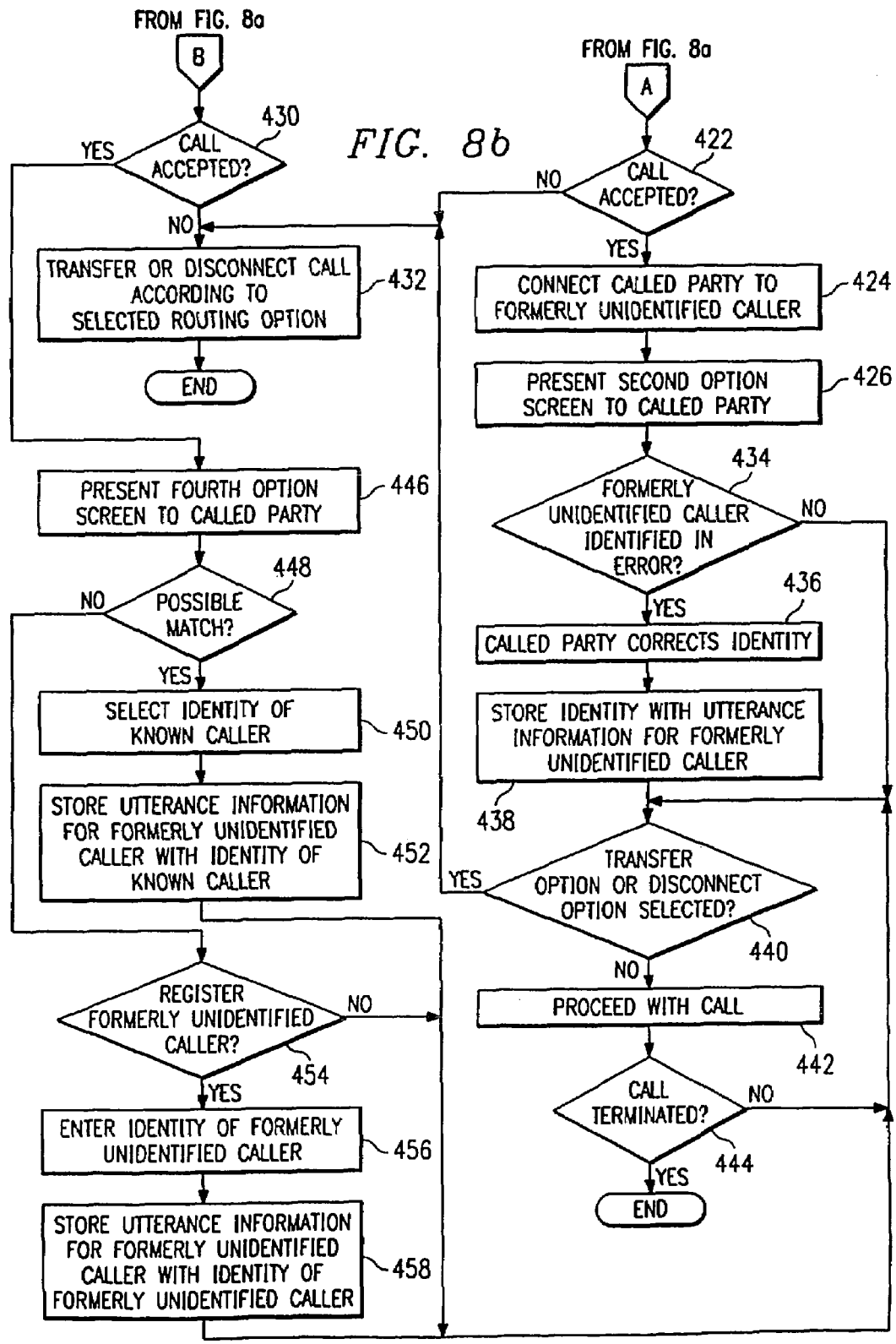

AUTHENTICATING A CALLER BEFORE PROVIDING THE CALLER WITH ACCESS TO ONE OR MORE SECURED RESOURCES

CROSS REFERENCE TO RELATED APPLICATIONS

This application is a continuation of U.S. application Ser. No. 10/352,848, filed Jan. 27, 2003, which is a continuation of U.S. application Ser. No. 09/799,977, filed Mar. 2, 2001 (now U.S. Pat. No. 6,526,126 B1, issued Feb. 25, 2003), which is a continuation of U.S. application Ser. No. 08/982,190, filed Dec. 17, 1997 (now U.S. Pat. No. 6,205,204 B1, issued Mar. 20, 2001), which is a continuation-in-part of U.S. application Ser. No. 08/672,677, filed Jun. 28, 1996 (now U.S. Pat. No. 5,940,476, issued Aug. 17, 1999), a continuation-in-part of U.S. application Ser. No. 08/819,482, filed Mar. 17, 1997 (now U.S. Pat. No. 5,901,203, issued May 4, 1999), and a continuation-in-part of U.S. application Ser. No. 08/918,937, filed Aug. 25, 1997 (now U.S. Pat. No. 6,529,881 B2, issued Mar. 4, 2003).

BACKGROUND OF THE INVENTION

1. Field of the Invention

This invention relates in general to the field of telecommunications, and more particularly to authenticating a caller before providing the caller with access to one or more secured resources.

2. Background Art

Many people, organizations, and commercial and other establishments may identify callers, customers, and other persons for security, billing, record keeping, or other purposes. For example, a customer service representative for a mail order sales organization might identify a caller to verify the caller's authority to receive information concerning an order placed with the organization. A called party in a business, organizational, home, or other setting might elect to accept a call, disconnect a call, or route a call to another person or processing device according to the identity of the caller. A clerk for a commercial or other establishment might identify a customer at the point of sale to allow an informed decision to be made regarding whether to provide goods, services, or other benefits to the customer.

As identification and identity verification procedures become more advanced to serve various needs, these people, organizations, and establishments may identify callers, customers or other persons using a variety of techniques. A known technique for identifying a caller receives a telephone number associated with an incoming call and compares the number with previously stored information to identify the caller associated with the incoming call. These techniques may be unsatisfactory if the caller is calling from a telephone, extension, or location having a telephone number that is different than the number for which there is previously stored information. Other techniques may even compare a spoken word or phrase identifying the caller with a stored voice print to verify an identification made as a result of personal interaction with the caller or through digit or voice recognition of a personal identification number (PIN), account number, or other identifier. These and other techniques requiring personal interaction with callers to generate information for comparison with stored identification information are often relatively inefficient and costly.

A known technique for identifying a customer includes receiving a PIN or account number to identify the customer, either verbally or using a magnetic card reader, and then comparing the number with previously stored information to verify the availability to the customer of a good, service, or other benefit. Such techniques are wholly inadequate if the customer loses his card or has it stolen, cannot remember his number or identifier, or is otherwise unable to provide the requisite information. Furthermore, such techniques are burdensome to both the customer and the establishment in that the customer must remember the number or identifier, or carry with him the appropriate card, and the establishment must devote employee resources to the identity verification process.

Although possibly acceptable to verify the identity of an identified caller, customer, or other person, the above techniques do not identify an unidentified person out of a universe of known persons. These and other disadvantages make previous techniques for identifying persons inadequate for many applications.

SUMMARY OF THE INVENTION

The present invention addresses disadvantages and problems associated with previous systems and methods for identifying persons.

In one embodiment, a system is provided for authenticating a caller before providing the caller with access to one or more secured resources. Identification and verification data is stored during system enrollment of a plurality of known persons. A processing system is operable to, in a current call initiated by a currently unidentified caller and prior to identification of the currently unidentified caller, receive voice-based information for the currently unidentified caller based on one or more words spoken by the currently unidentified caller in the current call, the received voice-based information for the currently unidentified caller including a digital representation of a telephone number spoken by the currently unidentified caller in the current call, the received voice-based information including voice-based identification information and voice-based verification information for the currently unidentified caller. The processing system is operable to automatically compare the received voice-based identification information and the received voice-based verification information for the caller, which was received in the current call prior to identification of the currently unidentified caller, with the stored identification and verification data for a plurality of known persons, respectively, which was stored during enrollment of these known persons, to uniquely identify and verify the identity of the caller as a particular one of these known persons. The processing system is operable to authenticate the caller for access to the one or more secured resources in response to uniquely identifying and verifying the identity of the caller as the particular one of the known persons.

In another embodiment, a system is provided for uniquely and unambiguously identifying a currently unidentified caller. Voiceprint data is stored for each of a plurality of known persons, and additional identifying data is stored for each of the plurality of known persons, the voiceprint data and additional identifying data for each known person having been stored independently of each other in one or more previous calls that were initiated by the known person. A processing system is operable to, in a current call initiated by a currently unidentified caller and prior to identification of the caller, receive voiceprint data and additional identifying data for the caller, the voiceprint data and additional identifying data for the caller being independent of each other. The processing system is operable to automatically perform an initial comparison of the voiceprint data for the still currently unidentified caller, which was received in the current call prior to identification of the caller, with the stored voiceprint data for at least one known person, which was stored in one or more previous calls initiated by the known person, to positively identify the caller as at least one of the known persons. If the caller is positively yet ambiguously identified as more than one of the known persons as a result of the initial comparison, the processing system is operable to automatically perform an additional comparison of the additional identifying data for the caller, which was received in the current call prior to identification of the caller, with the stored additional identifying data for at least one known person, which was stored in one or more previous calls initiated by the known person, to uniquely and unambiguously identify the caller as a particular one of the known persons. The additional identifying data for a known person includes one of at least a portion of a telephone number, at least a portion of a network address, a store identifier, and historical purchasing information.

The present invention provides a system and method for identifying an unidentified person that does not merely verify the identity of the person, but identifies the unidentified person from among a universe of known persons while resolving any ambiguities in that identification. Although the present invention identifies the unidentified person irrespective of the location, switching system, trunk line, or telephone number from which the person may be calling, the present invention uses such information as one or more ambiguity-resolution criteria when appropriate to resolve an ambiguous identification of the person as two or more known persons. The present invention may therefore increase the efficiency and accuracy of the identification process. Other ambiguity-resolution criteria, for example, store identifiers, historical purchasing information, and other suitable criteria, may be similarly employed.

In a commercial setting, the system and method of the present invention identifies an unidentified person at the point of sale, using appropriate criteria to resolve ambiguous identifications, without requiring the person to remember a PIN, account number, or other identifier, or to physically provide a card containing this information in magnetic form. Furthermore, the present invention may be self-learning, such that the likelihood of identifying a particular unidentified person increases each time the person interacts with the system. Moreover, the present invention may automatically provide stored information concerning a known person in response to the system identifying the unidentified person as the known person, which further increases the efficiency of the interaction with the person.

BRIEF DESCRIPTION OF THE DRAWINGS

For a more complete understanding of the present invention and for further features and advantages thereof, reference is now made to the following description taken in conjunction with the accompanying drawings, in which:

FIGS. 3a through 3c illustrate relationships between account identifiers for known callers and identity data, order data, and utterance data respectively, for the known callers;

FIGS. 4a and 4b are a flow chart illustrating a method of identifying an unidentified caller;

FIGS. 8a and 8b are a flow chart illustrating a method of identifying an unidentified caller;

DETAILED DESCRIPTION OF THE INVENTION

Figure 1:
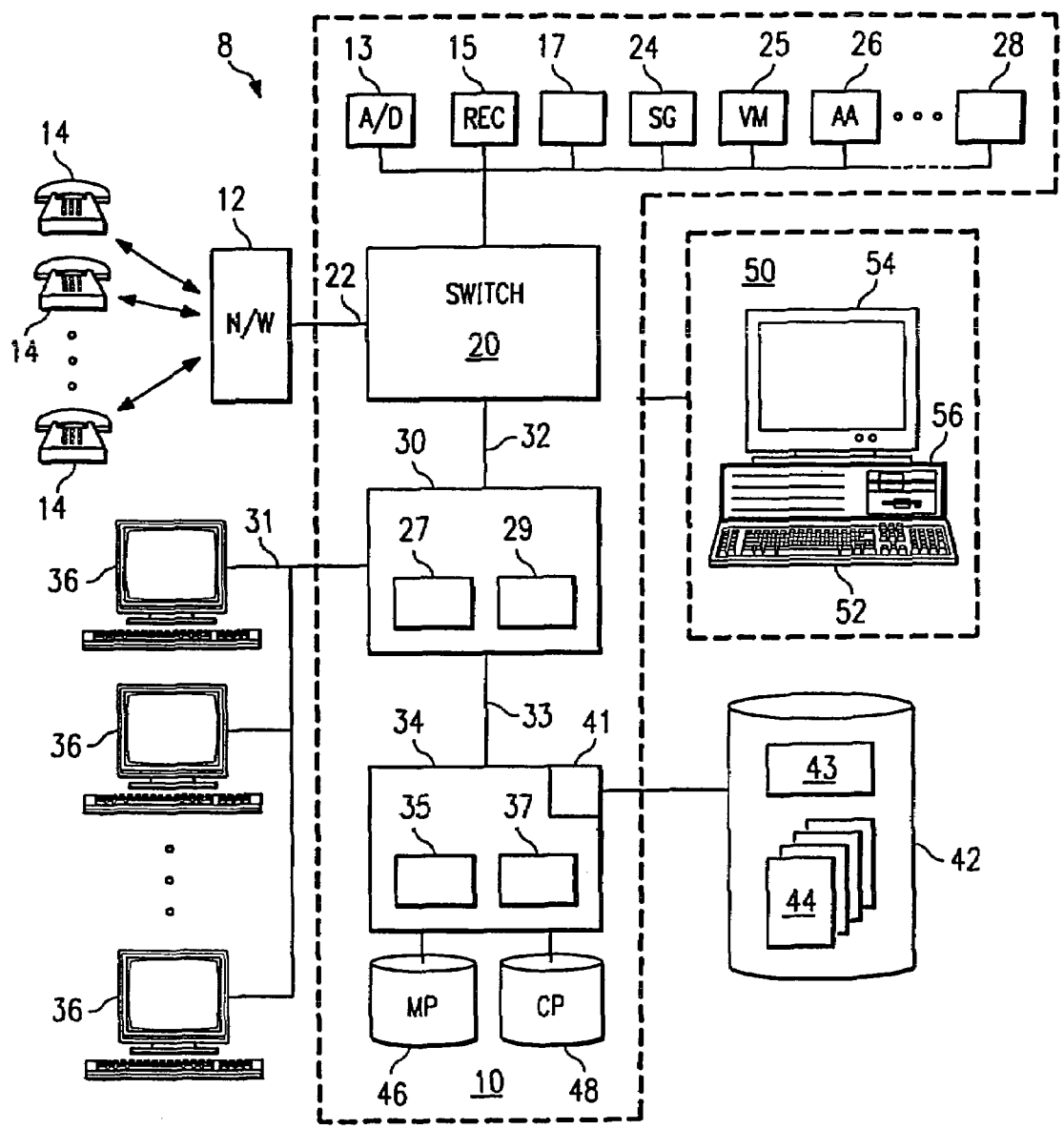
FIG. 1 illustrates a system for identifying an unidentified caller.

FIG. 1 illustrates a system 8 for identifying an unidentified caller that includes a processing system 10, a network (N/W) 12, one or more agents 36, and a database 42. Processing system 10 is coupled to and interacts with network 12. Network 12 may be a public switched telephone network (PSTN) or any other suitable network to receive incoming calls from one or more unidentified callers 14 and transmit the incoming calls to a telephone switching system (SWITCH) 20 using link 22. Network 12 may include one or more local, exchange area, and/or long-haul networks to communicate information in analog, digital, or any other suitable form using any appropriate transmission facility. Link 22 may include one or more subscriber lines or other appropriate wireline or wireless links for connecting unidentified callers 14 to switching system 20 using network 12. Although unidentified callers 14 are discussed in the plural, the present invention contemplates a single or multiple unidentified callers 14.

Switching system 20 may be a private branch exchange (PBX) system; a central exchange (centrex) system; an automatic call distribution (ACD) system; a key telephone system; a telephone that is directly, indirectly, locally, remotely, or otherwise connected to network 12; or any other appropriate telephone switching system. Switching system 20 may include a speech generation capability (SG) 24, a voice messaging (VM) capability 25, an automated attendant (AA) capability 26, and any other suitable voice processing or call processing capabilities 28, in any suitable combination, whether directly integrated into switching system 20 or as adjunct processors operating on one or more computers or other processing devices at one or more locations and appropriately coupled to switching system 20. Switching system 20 also includes analog-to-digital (A/D) conversion and recording (REC) facilities 13 and 15, respectively, which may include suitable hardware and software to digitize and record utterances provided by unidentified callers 14. In one embodiment, switching system 20 includes a suitable "caller ID," automatic number identification (ANI), or other facility 17 that identifies telephone numbers, or portions thereof such as area codes or office codes, from which unidentified callers 14 are calling. While not shown, switching system 20 further includes one or more call processors for coordinating the operations of the various components of switching system 20 and one or more suitable buses to allow the components to communicate information.

Switching system 20 is coupled to and interacts with system server 30 using link 32. Link 32 may be any suitable connection through a local area network (LAN), metropolitan area network (MAN), wide area network (WAN), a global computer network such as the Internet, or other appropriate network; a standard data link and protocol connection used to connect an external computer to a telephone switching system, such as a Telephony Services Application Programming Interface (TSAPI); a service provider's proprietary interface; an integrated services digital network (ISDN) link; an internal bus; or any other appropriate connection. The present invention contemplates system server 30 being integral to or separate from switching system 20.

System server 30 is a mainframe computer or other processing device that manages communications between switching system 20, agents 36, and database server 34 using links 32, 31, and 33, as the case may be. System server 30 may also manage communications between processing system 10 and a network or other resource external to network 12, agents 36, and processing system 10. System server 30 includes a memory 27 and a processor 29 that together operate to store, process, or manipulate data. Memory 27 may be any suitable memory, such as dynamic or static random access memory (RAM), read only memory (ROM), magnetic media, optical media, CD-ROM, or other suitable volatile or non-volatile storage media. Memory 27 may store information in files, directories, tables, or in any other suitable arrangement. Memory 27 may contain instructions for processor 29 to execute in managing the operations of system server 30. The present invention contemplates multiple system servers 30 operating in parallel to increase the speed or otherwise improve the performance of processing system 10 in identifying one or more unidentified callers 14.

Agents 36 may be autonomous or operated by one or more employees, representatives, operators, or other persons, possibly associated with an organization, that may interact in some manner with unidentified callers 14. Link 31 may be a connection through a LAN, MAN, WAN, a global computer network such as the Internet, or any other suitable communications connection. Agents 36 may be any logical entities in hardware and/or software, such as minicomputers or personal computers, that send and receive information using link 31 and system server 30. In one embodiment, a particular agent 36 interacts with unidentified caller 14 once unidentified caller 14 has been identified using processing system 10. Although agents 36 are discussed, the present invention contemplates more or fewer agents 36 depending on the organization and the incoming call traffic generated by unidentified callers 14.

Database server 34 is coupled to and interacts with database 42 and an associated database management system (DBMS) 43. In one embodiment, database 42 is a relational database that stores information in tables containing rows and columns of data. The rows of a table represent records, which are collections of information about separate items, and the columns represent fields, which are particular attributes of the records. In conducting searches, database 42 matches information from a field in a first table with information in the corresponding field of a second table to produce a third table that combines requested data from the first and second tables. In general, database 42 uses matching values in two tables to relate information in one table to information in the other table. Database 42 may store and retrieve data in any suitable manner, and may include one or more databases, files, or other data repositories at a single or multiple locations internal to or external to processing system 10. Database 42 may be more or less permanent or may be a temporary database, file, or other data repository created by extracting information from more permanent databases, files, or other data repositories for use in identifying unidentified callers 14.

Database 42 contains one or more records 44 that each represent the association of an account or other identifier corresponding to a caller whose identity is known to the organization with account data, order data, identity data, utterance data, or other suitable information concerning the known caller. In one embodiment, the utterance data for each known caller includes one or more utterance identifiers that are digitized representations of one or more spoken utterances of the particular known caller, which may include any suitable sound, word, or phrase. The utterances provided by the known callers are digitized and recorded using the facilities 13 and 15, respectively, associated with switching system 20. The present invention contemplates multiple utterance identifiers for each known caller, whether stored in a single or multiple records 44 and in a single or multiple tables within database 42. The association of account identifiers with identity data, order data, and utterance data for each known caller in records 44 is discussed more fully below in connection with FIGS. 3a through 3c.

Database server 34 may be a mainframe computer, a minicomputer, microprocessor having memory, or personal computer connected to a LAN, or any other processing device that manages communications between system server 30 and database 42. Although database server 34 is shown as separate from system server 30, database server 34 may be integral to or separate from system server 30. Database server 34 supports a DBMS 43 that permits centralized control of security and data integrity requirements for database 42.

In general, DBMS 43 is a layer of software between database 42 and database server 34 that manages access by processing system 10 to the resources of database 42. Where database 42 is a relational database, the DBMS 43 supported by database server 34 may be a relational DBMS (RDBMS). DBMS 43 and database 42 may execute queries, conduct searches, or perform other activities in response to direct or indirect communications from database server 34 in any suitable form. In one embodiment, database server 34 may provide a key or other suitable identifier to DBMS 43 for DBMS 43 to use in finding, identifying, or otherwise locating one or more records or groups of records within database 42 according to one or more key tables, index files, or other suitable arrangement.

Database server 34 includes a memory 35 and a processor 37 that together operate to store, process, or manipulate data. Memory 35 may be any suitable memory, such as dynamic or static random access memory (RAM), read only memory (ROM), magnetic media, optical media, CD-ROM, or other suitable volatile or non-volatile storage media. Memory 35 may store information in files, directories, tables, or in any other suitable arrangement. Memory 35 may contain instructions for processor 37 to execute in managing the operations of database server 34 and the DBMS 43 supported by database server 34.

Database server 34 accesses one or more match parameters 46 to determine whether a digitized utterance for an unidentified caller 14 is sufficiently correlated with an utterance identifier corresponding to a particular known caller to identify the unidentified caller 14 as the known caller. Match parameters 46 may include, without limitation: an error or discrimination threshold suitable for comparison with an error value derived, calculated, or otherwise determined according to the comparison of the digitized utterance with the utterance identifier, for example, in the manner disclosed in U.S. Pat. No. 4,053,710, which is incorporated by reference herein; a merit parameter for associating a figure of merit, determined according to some suitable scale and in some suitable manner, with the identification of an unidentified caller 14 as a particular known caller; or any other information suitable for determining the sufficiency of the correlation, if any, between utterances for unidentified callers 14 and utterance identifiers for known callers in database 42. Database server 34 may communicate one or more match parameters 46 to DBMS 43 in association with a key or other suitable identifier to facilitate the location and retrieval of one or more utterance identifiers or other information from database 42.

Database server 34 communicates with database 42 using interface 41. Interface 41 may be any mechanism suitable to allow database server 34 and database 42 to communicate with one another. For example, interface 41 may include the appropriate hardware and software to communicate using a direct connection to a PSTN, a direct connection using a bus or wireline link, a connection through a LAN, MAN, WAN, a global network such as the Internet, or other network, or any other communications connection suitable to access one or more databases or files at one or more locations. Interface 41 may include protocol conversion and some data processing capabilities suitable to allow interface 41 to facilitate data communications between database server 34 and database 42.

Database server 34 and interface 41 may access one or more communication parameters 48 to communicate with database 42. Communications parameters 48 maintain access information for each database, file, directory, or other data repository associated with database 42 that may include, without limitation: a username; a password; a telephone number; an Internet protocol (IP) address; communication port settings; database specifications; library and file names; directory paths; library and file paths; protocol information; and any other information suitable for communicating information to and receiving information from database 42.

Processing system 10 may operate on one or more computers 50 that are integral to or separate from the hardware and software that support network 12, agents 36, system server 30, database server 34, and database 42. Computer 50 may include an input device 52, such as a keypad, touch screen, microphone, or other device that can accept suitable information. An output device 54 may convey information associated with the operation of processing system 10, including digital or analog data, visual information, or audio information. Both input device 52 and output 54 may include fixed or removable storage media, such as magnetic computer disk, CD-ROM, or other suitable media to both receive output from and provide input to processing system 10. Computer 50 may have a processor 56 and an associated volatile or non-volatile memory to execute instructions and manipulate information in accordance with the operation of processing system 10.

In operation with respect to agents 36, an unidentified caller 14 places a call to the organization using network 12 and link 22. Switching system 20 receives the incoming call and prompts unidentified caller 14 to provide an utterance, such as the spoken name of unidentified caller 14, using the associated speech generation capability 24, by playing a prerecorded message, or in any other suitable manner. Before, during, or after prompting unidentified caller 14 to provide an utterance, switching system 20 uses facility 17 to identify the telephone number, or portion thereof such as the area code or office code, from which unidentified caller 14 is calling. When unidentified caller 14 responds by providing an utterance, switching system 20 receives, digitizes, and records the utterance using facilities 13 and 15, respectively. Switching system 20 communicates the digitized utterance to system server 30 and queues the incoming call until an appropriate agent 36 becomes available. When an appropriate agent 36 becomes available, switching system 20 transfers the call to the appropriate agent 36 and provides the identity of the selected agent 36 to system server 30.

In parallel with the queuing and transfer of the incoming call, system server 30 communicates the digitized utterance to database server 34, which together with associated DBMS 43 searches records 44 contained in database 42 to compare the digitized utterance with the stored utterance identifiers corresponding to one or more known callers. If the digitized utterance suitably duplicates, resembles, matches, or is otherwise correlated with a stored utterance identifier according to one or more match parameters 46, unidentified caller 14 is identified as the known caller corresponding to the particular stored utterance identifier. Database server 34 retrieves account data, order data, identity data, or any other appropriate information for the known caller from database 42 and communicates this information to the selected agent 36 using system server 30 and link 31.

One or more ambiguity-resolution criteria may be used to identify unidentified caller 14. Ambiguity-resolution criteria may be stored as account data, order data, identity data, or in any other suitable manner and may be compared with any of the following ambiguity-resolution information to resolve ambiguous identifications, without limitation: the telephone number or any portion thereof identified using facility 17; an IP address from which unidentified caller 14 is calling in over the Internet or other computer network; a store location, store number, or other identifier determined using the number identified using facility 17, an IP address, or in any other suitable manner; and any other appropriate ambiguity-resolution information. As discussed more fully below with reference to FIGS. 4a and 4b, processing system 10 uses one or more appropriate ambiguity-resolution criteria and appropriate ambiguity-resolution information to resolve an ambiguous identification of unidentified caller 14 as two or more known callers.

Processing system 10 may coordinate and synchronize the identification of and transfer of the call to selected agent 36; the identification of unidentified caller 14 as a particular known caller, whether or not an ambiguity-resolution criterion is used; the retrieval of information corresponding to the known caller from database 42; and the communication, delivery, or presentation of the information to selected agent 36 using any appropriate technique, whether or not switching system 20 and system server 30 are integrated with one another. After the selected agent 36 receives the retrieved information for the formerly unidentified caller 14, the selected agent may interact with the caller to handle the incoming call in some suitable manner according to the needs of the caller or the organization. The present invention contemplates identifying one or more unidentified callers 14 using system 8 in any suitable business, organizational, or other context or application.

Figure 2:
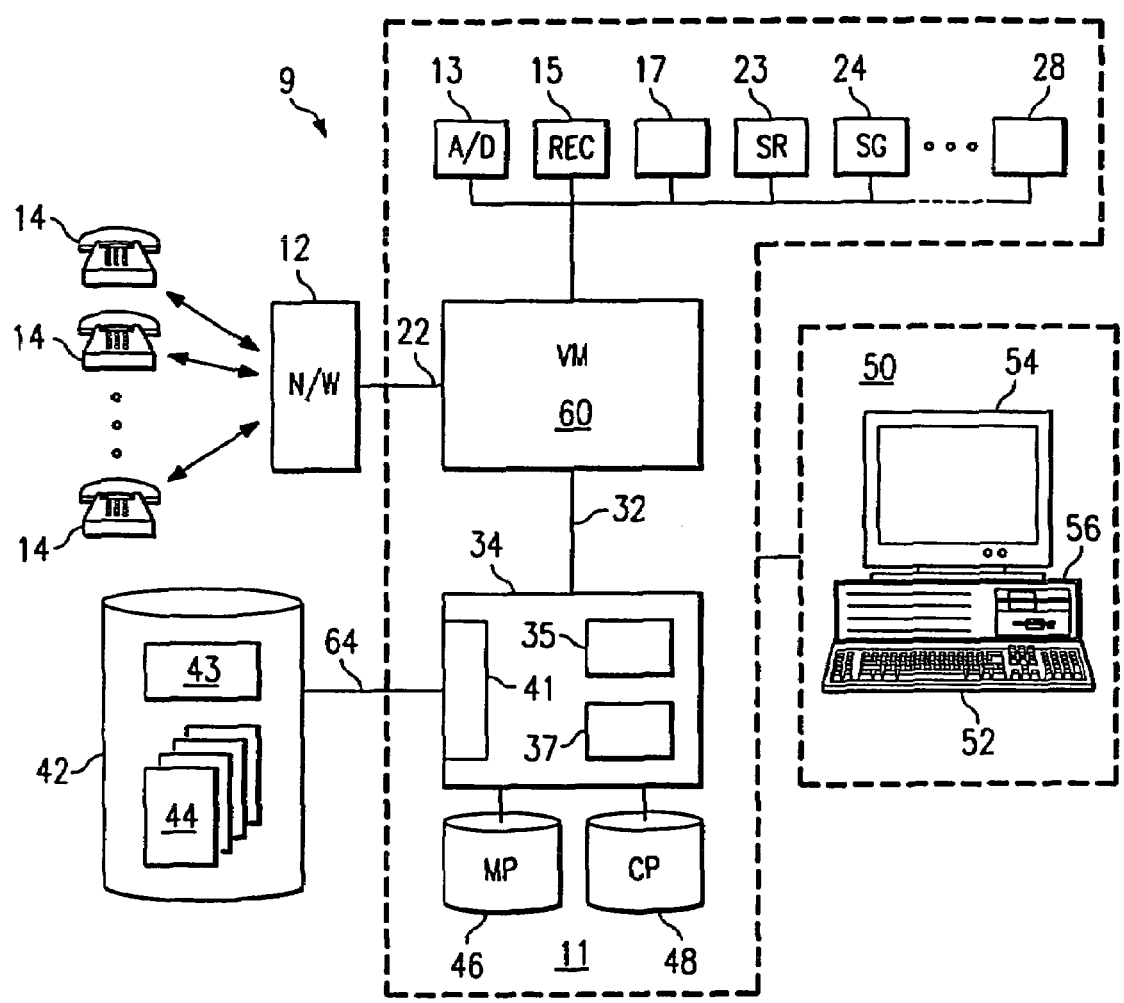
FIG. 2 illustrates a system for identifying an unidentified caller in a voice messaging environment.

FIG. 2 illustrates a system 9 for identifying an unidentified caller 14 in a voice messaging environment that includes a processing system 11, a network 12, and a database 42. The components and operation of system 9 that includes processing system 11 are similar to those discussed above with reference to FIG. 1 and system 8 that includes processing system 10. System 9 may or may not include switching system 20, automated attendant capability 26, system server 30, or agents 36. The present invention contemplates system 9 that includes processing system 11 replacing or combining with system 8 that includes processing system 10 in some manner. Similar to processing system 10 discussed above, processing system 11 may operate on one or more computers 50 that are integral to or separate from the hardware and software that support network 12, database server 34, and database 42.

Voice messaging system 60 may be any voice mail or other system for receiving, recording, and storing messages from one or more unidentified callers 14 within or outside the organization. Voice messaging system 60 may be the same as, may replace, or may combine with voice messaging capability 25 of processing system 10 in some suitable manner. Voice messaging system 60 may be integral to or separate from a telephone switching system, such as switching system 20 discussed above in connection with FIG. 1, and may receive incoming calls directly or through such a telephone switching system. Voice messaging system 60 may include analog-to-digital conversion facility 13, recording facility 15, "caller ID," ANI, or other facility 17, a suitable speech recognition capability (SR) 23, speech generation capability 24, or any other suitable voice processing or call processing capabilities 28, in any combination, whether directly integrated into voice messaging system 60 or as adjunct processors operating on one or more computers or other processing devices at one or more locations and suitably coupled to voice messaging system 60.

In operation, an unidentified caller 14 places a call to the organization using network 12 and link 22. Voice messaging system 60 receives the incoming call and, if voice messaging system 60 is not connected to a telephone system in such a way as to determine the identity of unidentified caller 14 according to the location, switching system, trunk line, or telephone number associated with unidentified caller 14, prompts unidentified caller 14 to provide an utterance in the manner discussed above in connection with FIG. 1. When unidentified caller 14 responds by providing an utterance, voice messaging system 60 receives, digitizes, and records the utterance using facilities 13 and 15, respectively.

Voice messaging system 60 communicates the digitized utterance to database server 34, which together with associated DBMS 43 searches records 44 contained in database 42 to compare the digitized utterance with stored utterance identifiers corresponding to one or more known callers. If the digitized utterance suitably duplicates, resembles, matches, or is otherwise correlated with a particular utterance identifier according to one or more match parameters 46, unidentified caller 14 is identified as the known caller corresponding to the particular utterance identifier. As discussed more fully below with reference to FIGS. 5a and 5b, one or more ambiguity-resolution criteria may be used. Database server 34 retrieves appropriate information concerning the known caller from database 42, such as a name or other identifier corresponding to the known caller, and communicates this information to voice messaging system 60. Voice messaging system 60 prompts formerly unidentified caller 14 to provide a message, records the resulting message, associates the identity of formerly unidentified caller 14 with the message, and stores the associated identity and message corresponding to formerly unidentified caller 14 for subsequent communication to a user of voice messaging system 60.

When a user of voice messaging system 60 accesses voice messaging system 60, using a telephone connection, an integrated computer system, or in some other suitable manner, voice messaging system 60 provides the user with the identity of formerly unidentified caller 14 to indicate that a message corresponding to formerly unidentified caller 14 has been recorded. Voice messaging system 60 may provide the identity of formerly unidentified caller 14 to the user separately from or together with the recorded message. Where messages corresponding to multiple unidentified callers 14 have been recorded, voice messaging system 60 may provide the user with the identities of these formerly unidentified callers, in the form of a chronological list or otherwise, separately from or together with the corresponding recorded messages.

FIGS. 3a through 3c illustrate several exemplary relationships between account identifiers corresponding to one or more known callers and identity data, order data, and utterance data, respectively, for the known callers. Although in one embodiment, the tables discussed below may be related to one another using these account identifiers, the present invention contemplates using any suitable field within a record 44 to relate the record 44 to one or more other records 44 or tables of records 44 within database 42, according to relational database techniques or in some other suitable manner. An account identifier for a known caller may include, for example, an account number for an account the known caller has with the organization. The present invention contemplates a particular known caller having multiple accounts and therefore multiple account identifiers and multiple records 44 in one or more of the tables discussed below. As discussed above, processing system 10 may use some or all of the information contained in records 44 as ambiguity-resolution criteria to resolve an ambiguous identification of unidentified caller 14 as two or more known callers.

FIG. 3a illustrates a table 100 that contains one or more records 44 for each known caller. Each record 44 includes an account identifier 102 that corresponds to a particular known caller and is associated with identity data 104 for the known caller. For each known caller, identity data 104 may include, without limitation: a last name, first name, middle name or initial, or other suitable identifier 106; a gender 108; a street or other address 110; a city, county, state, country, or other location of residence 112; a phone number or any portion thereof such as an area code or office code, facsimile number, IP or other network address, or another suitable communications identifier 114; an organization or firm identifier 116; a department or strategic business unit (SBU) identifier 118; a location, number, or other identifier 119 associated with one or more commercial establishments, government offices, or other premises at which the known caller has received goods, services, or other benefits; historical purchasing information 121; a security clearance 120; and any other suitable identity information concerning a known caller and suitable for associating with an account identifier 102 for the known caller. The present invention contemplates multiple tables 100 arranged in any suitable manner to contain one or more account identifiers 102 in association with identity data 104 for each known caller.

FIG. 3b illustrates a table 130 that contains one or more records 44 for each known caller that each include an account identifier 102 that corresponds to a particular known caller and associated order data 132 for the known caller. Although order data 132 is discussed, the present invention contemplates one or more other tables containing records 44 for any type of information concerning the known callers, for example, banking, purchase, account, or other data concerning relationships the known callers have with the organization. Table 130 may contain multiple records 44 and order data 132 for any known caller, corresponding to multiple orders for the known caller.

Within each record 44, order data 132 may include, without limitation: a unique order identifier 134 assigned to the order by the organization or otherwise; an order date 136; a part number 138 assigned to each ordered item by the manufacturer or otherwise; a manufacturer identifier 140 for each ordered item; a serial number 142 for each ordered item; an individual, aggregate, or other purchase amount 144 for the ordered items; an order status 146; and any other information suitable for identifying, tracking, maintaining billing and inventory records for, or relating in any other suitable manner to the order that corresponds to the particular record 44.

FIG. 3c illustrates a table 160 that contains one or more records 44 for each known caller that each include an account identifier 102 that corresponds to the particular known caller and associated utterance data 162 for the known caller. For each record 44, utterance data 162 may include, without limitation: an utterance identifier 164 that includes any suitable digital or other representation of a verbal utterance provided by the particular known caller associated with the record 44; parametric encoding data 165 corresponding to the utterance or one or more characteristics of the known caller; an utterance length 166 that is measured, assessed, calculated, or otherwise determined in any suitable manner according to any suitable scale; an average or other utterance pitch 168 that is measured, assessed, calculated, or otherwise determined in any suitable manner according to any suitable scale; the name 106 for the known caller; the gender 108 for the known caller, which may be associated in some manner with the utterance pitch 168; and any other information concerning an utterance of a known caller that is suitable for comparison in some manner with corresponding information generated for an utterance provided by an unidentified caller 14.

Table 160 may contain one or more records 44 for each account identifier 102, each record 44 containing utterance data 162 that corresponds to a separately digitized and recorded utterance of the known caller associated with the account identifier 102. Furthermore, database 42 may contain multiple tables 160, each table corresponding to a specified range, minimum, maximum, or other value for one or more fields within utterance data 162, such as utterance length 166, utterance pitch 168, gender 108, or other suitable field. For example, a first table 160 might contain records 44 having utterance lengths 166 within a first range of values, a second table 160 might contain records 44 having utterance lengths 166 within a second range of values, and a third table 160 might contain records 44 having utterance lengths 166 within a third range of values. In identifying an unidentified caller 14, processing system 10 may determine the length of the digitized utterance for unidentified caller 14 and compare the digitized utterance to one or more utterance identifiers 164 contained in the particular table 160 that corresponds to the length of the digitized utterance. Database 42 may contain as many tables 160 and types of tables 160 as are necessary or desirable.

Parametric encoding data 165 may be stored separately from or together with a corresponding utterance identifier 164. In one embodiment, parametric encoding data 165 might represent one or more fields of identity data 104, order data 132, utterance data 162, or any other information concerning the particular known caller that is suitable for association with utterance identifier 164 to identify an unidentified caller 14. For example, parametric encoding data 165 might take the form of one or more moment invariants as disclosed in U.S. Pat. No. 4,053,710 to represent the utterance for the known caller more concisely than the utterance is represented by the corresponding utterance identifier 164. A moment invariant is defined in U.S. Pat. No. 4,053,710, for a two dimensional waveform or wave pattern, as a measurement derived from the moment of the waveform, the moment being independent of the waveform position and the waveform size along the two dimensions. The moment invariants may be calculated by switching system 20 or an associated processing capability and then stored instead of, or in addition to, utterance identifier 164, which may digitally represent the utterance in its entirety.

Figure 4A:
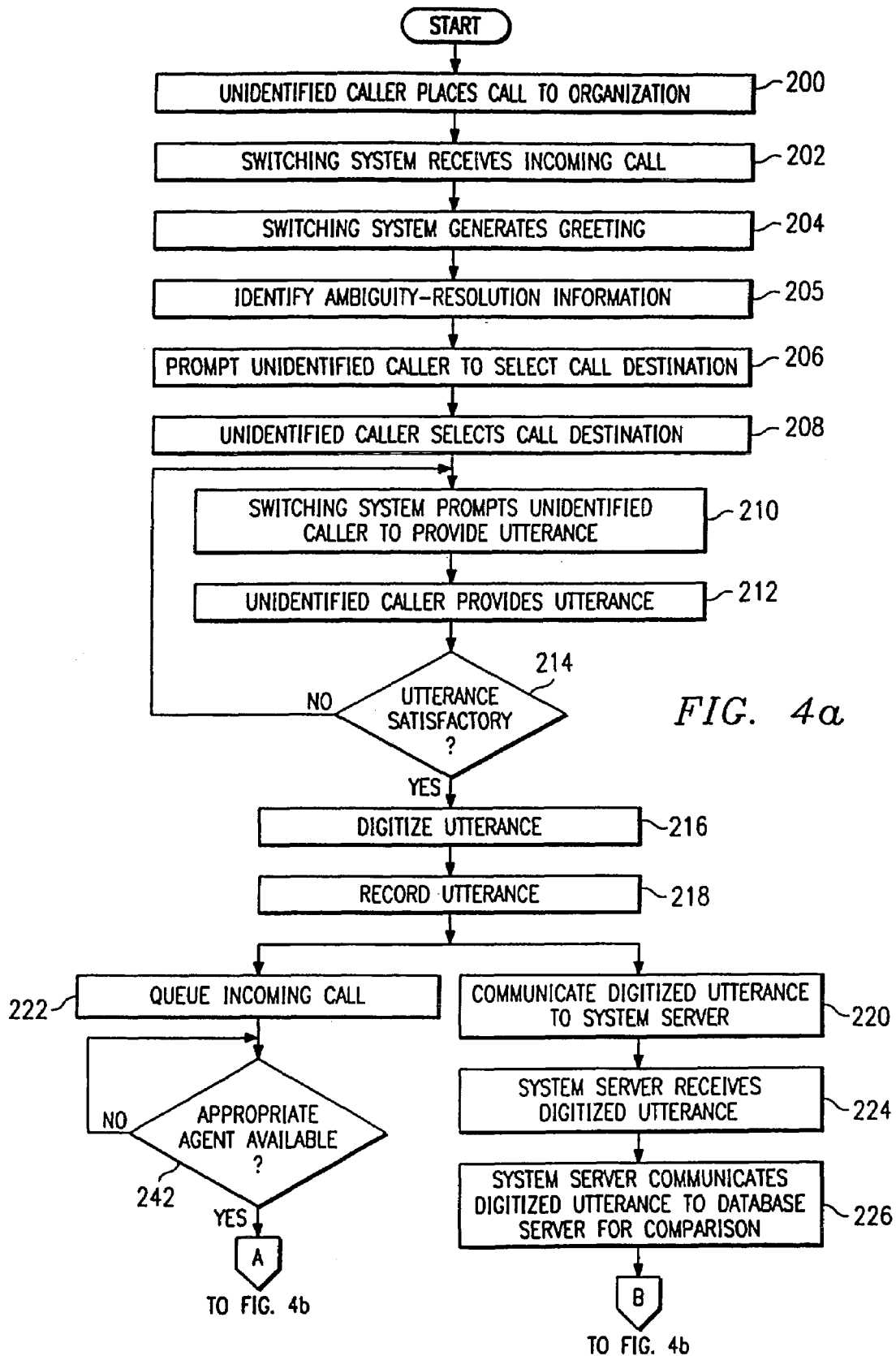

FIGS. 4a and 4b represent a flow chart of a method of identifying an unidentified caller 14. The method begins at step 200, where an unidentified caller 14 places a call to the organization using network 12 and link 22. Although system 8 may receive and process incoming calls from multiple unidentified callers 14 serially, more or less simultaneously, or in any other temporal relationship, the method is discussed herein with reference to a single unidentified caller 14. At step 202, switching system 20 receives the incoming call from unidentified caller 14 and, at step 204, generates a greeting for communication to unidentified caller 14. Switching system 20 may generate the greeting using speech generation capability 24, may play a prerecorded message to generate the greeting, or may generate the greeting in any other suitable manner.

Before, during, or after generating the greeting at step 204, switching system 20 uses facility 17 at step 205 to identify the telephone number, or a portion thereof such as the three digit area code or three digit office code, from which unidentified caller 14 is calling. For example, if unidentified caller 14 is calling from the telephone number "(214) 555-1212," facility 17 may identify the entire number, the area code "214," or the office code "555," in any combination. Although three digit area codes and three digit office codes are discussed, facility 17 may identify any number of digits associated with the telephone number from which unidentified caller 14 is calling, in any suitable order and in any suitable combination. Switching system 20 may identify an IP or other network address of unidentified caller 14 at step 205 if unidentified caller 14 is calling over the Internet or other computer network. Other suitable techniques for associating an identifier with the telephone number, network address, or location from which unidentified caller 14 is calling may be used without departing from the intended scope of the present invention. One or more of these identifiers, singly or in any suitable combination, may be appropriate ambiguity-resolution information for use in resolving an ambiguous identification of unidentified caller 14 as two or more known callers.

In one embodiment, the greeting generated at step 204 prompts unidentified caller 14 to select a destination for the call at step 206. For example, and not by way of limitation, switching system 20 and associated automated attendant capability 26 may prompt unidentified caller 14 to select a call destination by playing a prerecorded message similar to the following: "Press or say '1' to be connected to our service department, press or say '2' to be connected to our order processing department, or stay on the line to speak with one of our customer service representatives." One or more agents 36 may each be associated with a particular call destination. As discussed below, switching system 20 may transfer the unidentified caller 14 to a particular agent 36 associated with the selected call destination at any appropriate time during the operation of system 8.

Either before or after unidentified caller 14 selects a call destination at step 208, switching system 20 prompts unidentified caller 14 at step 210 to provide an utterance, for example, any sound, word, or phrase, such as the name or account number of unidentified caller 14, that is suitable for comparison with one or more stored utterance identifiers 164 corresponding to one or more known callers. Switching system 20 may prompt unidentified caller 14 to provide an utterance using speech generation capability 24, by playing a prerecorded message to unidentified caller 14, such as "Whom may we say is calling?," or in any other suitable manner. At step 212, unidentified caller 14 responds by providing the requested utterance. If the utterance provided by unidentified caller 14 is inaudible, improper, or unsatisfactory at step 214, according to one or more specified parameters, the method returns to step 210, where unidentified caller 14 is again prompted to provide an utterance. If the utterance is satisfactory at step 214, switching system 20 digitizes the utterance at step 216 using analog-to-digital conversion facility 13 and records the digitized utterance at step 218 using recording facility 15.

At step 220, switching system 20 communicates the digitized utterance to system server 30 using link 32. At step 222, switching system 20 queues the incoming call pending the availability of an appropriate agent 36 to handle the incoming call, for example, a particular agent 36 associated with the call destination selected at step 208. Switching system 20 may perform steps 220 and 222 more or less in parallel, such that the branch of the method beginning at step 220 proceeds more or less in parallel with the branch of the method beginning at step 222. Referring to the branch beginning at step 220, system server 30 receives the digitized utterance corresponding to unidentified caller 14 at step 224 and, at step 226, communicates the digitized utterance to database server 34 for comparison with utterance identifiers 164 contained in database 42, tables 160, and records 44. As discussed above, database server 34 may be integral to or separate from system server 30.

At step 228, database server 34 accesses database 42 using interface 41 and communication parameters 48. At step 230, database server 34 and DBMS 43 search database 42 for one or more utterance identifiers 164 that duplicate, resemble, match, correlate with, or otherwise compare favorably to the digitized utterance corresponding to unidentified caller 14, according to one or more match parameters 46. Alternatively, database server 34 may communicate one or more match parameters 46 to DBMS 43 in association with the key or other suitable identifier to allow DBMS 43 and database 42 to locate or otherwise identify one or more utterance identifiers 164 that duplicate, resemble, match, correlate with, or otherwise compare favorably to the digitized utterance corresponding to unidentified caller 14.

In one embodiment, parametric encoding data 165 may be searched instead of, or in addition to, utterance identifiers 164 to identify unidentified caller 14. The use of parametric encoding techniques in connection with the search may speed the searching process, because the storage size for parametric encoding data 165 may be smaller than the storage size for corresponding utterance identifier 164. Furthermore, parametric encoding data 165 may be invariant with respect to factors used to identify unidentified caller 14. As a result, database server 34 and associated DBMS 43 may handle less data in searching database 42 to identify the unidentified caller 14 as a particular known caller represented in database 42.

One or more tables 160 may be searched serially, more or less simultaneously, or in any other suitable manner. One or more tables 160 may be selectively searched according to one or more characteristics of unidentified caller 14 or the utterance provided by unidentified caller 14, such as the gender of unidentified caller 14, the length of the utterance or corresponding digital representation, the average pitch of the utterance or corresponding digital representation, or other suitable characteristic. The present invention contemplates any suitable technique for comparing a digitized, parametric, or other representation of an utterance for unidentified caller 14 with utterance identifiers 164 or parametric encoding data 165, in any combination, for one or more known callers to identify unidentified caller 14 as a particular known caller.

The correlation between an utterance identifier 164 or parametric encoding data 165 and the digitized, parametric, or other representation of the utterance for unidentified caller 14 may be measured, assessed, calculated, or otherwise determined in any suitable manner. For example, parametric encoding techniques may allow database server 34 or another component of processing system 10 to generate one or more discrimination thresholds that may be used to determine whether the digitized utterance matches an utterance identifier 164 closely enough for unidentified caller 14 to be identified as the particular known caller corresponding to the utterance identifier 164. Parametric encoding techniques may allow database server 34 or another component of processing system 10 to calculate, arrive at, or otherwise determine a figure of merit, using one or more merit parameters contained in match parameters 46, a discrimination threshold, or other suitable factor, to indicate the certainty of an identification.

If a match is found for the digitized utterance corresponding to unidentified caller 14 at step 231, database server 34 may measure, assess, calculate, or otherwise determine a figure of merit for the match at step 232. If the identification of unidentified caller 14 is ambiguous at step 233, in that the digitized utterance for unidentified caller 14 matches utterance data 162 for two or more known callers at step 231, database server 34 searches records 44 for these known callers at step 234 for information that matches, correlates with, or is otherwise consistent with the identifier determined at step 205, according to appropriate parameters. Database server 34 may search records 44 for these known callers serially, simultaneously, or in another manner. Unidentified caller 14 is identified at step 235 as the known caller for which records 44 contain information most consistent with the identifier determined at step 205 or most consistent with information determined using the identifier, resolving the ambiguity.

For example, if unidentified caller 14 is calling from the telephone number "(214) 555-1212" and facility 17 identifies the area code "214" and the office code "555" as ambiguity-resolution information at step 205, database server 34 searches records 44 corresponding to the two or more known callers at step 234 for one or more ambiguity-resolution criteria consistent with this information. In one embodiment, consistent ambiguity-resolution criteria may be contained in table 100 as identical, geographically associated, or other consistent area code and office code communications identifiers 114 for a particular known caller. In this case, the known caller for which the area code, office code, or both area code and office code communications identifiers 114 are consistent with the selected ambiguity-resolution information is the known caller with which formerly unidentified caller 14 is identified at step 235.

To increase speed and conserve processing capability, processing system 10 may use as few ambiguity-resolution criteria as necessary to identify unidentified caller 14 as a particular known caller. For example, if records 44 in table 100 for two or more known callers contained identity data 104 consistent with the area code ambiguity-resolution information "214," then office code ambiguity-resolution criterion "555" would be used to resolve the ambiguity if possible. Similarly, if records 44 in table 100 for two or more known callers contained identity data 104 consistent with office code ambiguity-resolution information "555," an IP address ambiguity-resolution criterion might be used to resolve the ambiguity if possible. The present invention contemplates using as many ambiguity-resolution criteria, serially or in any other suitable manner, as necessary to adequately identify unidentified caller 14 as a particular known caller. In one embodiment, as discussed below, if suitable information concerning an ambiguous identification is provided to agent 36, agent 36 may participate in the ambiguity-resolution process.

At step 236, database server 34 and associated DBMS 43 retrieve information from database 42 corresponding to the known caller with which formerly unidentified caller 14 has been identified. The retrieved information may include some or all of the identity data 104, order data 132, or utterance data 162 for the known caller, banking, purchase, account or other data for the known caller, or any other information associated with the known caller and contained in database 42. Database server 34 communicates the retrieved information to system server 30 at step 238. At step 240, system server 30 communicates some or all of the retrieved information to an appropriate agent 36 in coordination with information received from switching system 20, as discussed below in connection with the branch of the method beginning at step 222.

At step 222, switching system 20 queues the incoming call from unidentified caller 14 pending the availability of an appropriate agent 36 to handle the incoming call. If an appropriate agent 36 is not available at step 242, the method loops until an appropriate agent becomes available. If an appropriate agent 36 is available at step 242, for example, a selected agent 36 associated with the call destination provided by unidentified caller 14 at step 208, then switching system 20 transfers the incoming call to selected agent 36 at step 244. At step 246, switching system 20 communicates the identity, location, network address, or other suitable routing or communication information concerning selected agent 36 to system server 30. System server 30 then communicates the retrieved information to selected agent 36 in some suitable manner at step 240. In one embodiment, if unidentified caller 14 has been ambiguously identified as two or more known callers, agent 36 may be provided with this information to allow agent 36 to assist in the ambiguity-resolution process, for example, by selecting a particular known caller based on one or more suitable parameters known or made available to agent 36.

Coordinating and synchronizing the identification of selected agent 36 using switching system 20, the identification of unidentified caller 14 as a particular known caller, the retrieval of information corresponding to the known caller from database 42, and the communication, delivery, or presentation of the information to selected agent 36 may be accomplished using any suitable technique. Such techniques may include, for example, and not by way of limitation: the technique disclosed in U.S. Pat. No. 5,309,504, which is incorporated by reference herein; one or more techniques according to a TSAPI specification; one or more techniques according to a telecommunications system provider's proprietary interface; or any other suitable "screen popping" or other technique. In one embodiment, switching system 20 and system server 30 are integrated to more easily coordinate and" synchronize the identification of selected agent 36, the identification of unidentified caller 14 as a particular known caller, and the communication of retrieved information concerning the known caller to the selected agent 36.

As discussed above, database server 34 or another component of processing system 10 may calculate or otherwise determine a figure of merit to indicate the extent of the correlation or the certainty of the match between the digitized utterance for formerly unidentified caller 14 and the utterance identifier 164 for the particular known caller with which formerly unidentified caller 14 has been identified. In one embodiment, the figure of merit is communicated to selected agent 36 along with the retrieved information for the particular known caller. If either a figure of merit has not been provided at step 248, or has been provided at step 248 and is deemed acceptable by selected agent 36 at step 250, in accordance with one or more specified parameters, the method proceeds directly to step 254, where selected agent 36 interacts with formerly unidentified caller 14 in some suitable manner according to the needs of the caller or the organization. If a figure of merit has been provided at step 248, but is not deemed acceptable by selected agent 36 at step 250, selected agent 36 may interactively verify the identity of formerly unidentified caller 14 according to conventional techniques at step 252. After selected agent 36 handles the call in some suitable manner at step 254, the method ends.

If processing system 10 is unable to match or suitably correlate the digitized utterance for unidentified caller 14 with an utterance identifier 164 corresponding to a known caller at step 231, or is unable to suitably resolve an ambiguous identification of unidentified caller 14 as two or more known callers at step 235, the agent 36 selected by switching system 20 may interactively verify the identity of unidentified caller 14 using conventional techniques at step 256. In one embodiment, the present invention is self-learning, such that if no match has been made at step 231 and unidentified caller 14 is identified interactively at step 256, system 8 may receive and store information for formerly unidentified caller 14 for use in identifying subsequent unidentified callers 14. For example, database 42 may not contain utterance data 162 to identify unidentified caller 14 when unidentified caller 14 calls the organization, because unidentified caller 14 may have had no previous interaction with the organization. Furthermore, database 42 may not yet contain utterance data 162 for any known callers, due to the length of time system 8 has been operating or for any other reason.

At step 258, processing system 10 may create a record 44 for formerly unidentified caller 14 containing an utterance identifier 164 and other utterance data 162 generated using the utterance provided at step 212. At step 260, the created record 44 for formerly unidentified caller 14 may be stored in one or more tables 160 within database 42. The created record 44 for formerly unidentified caller 14 may be associated with identity data 104, order data 132, or utterance data 162, banking, purchase, or account data, or other information concerning formerly unidentified caller 14, whether the information is generated before, during, or after the record 44 is created. In one embodiment, the created record 44 will correspond to a known caller for purposes of identifying subsequent unidentified callers 14 from among a universe of known callers. Before, during, or after storing the created record 44 at step 260, selected agent 36 handles the call in some suitable manner at step 254 and the method ends.

Figure 5A:
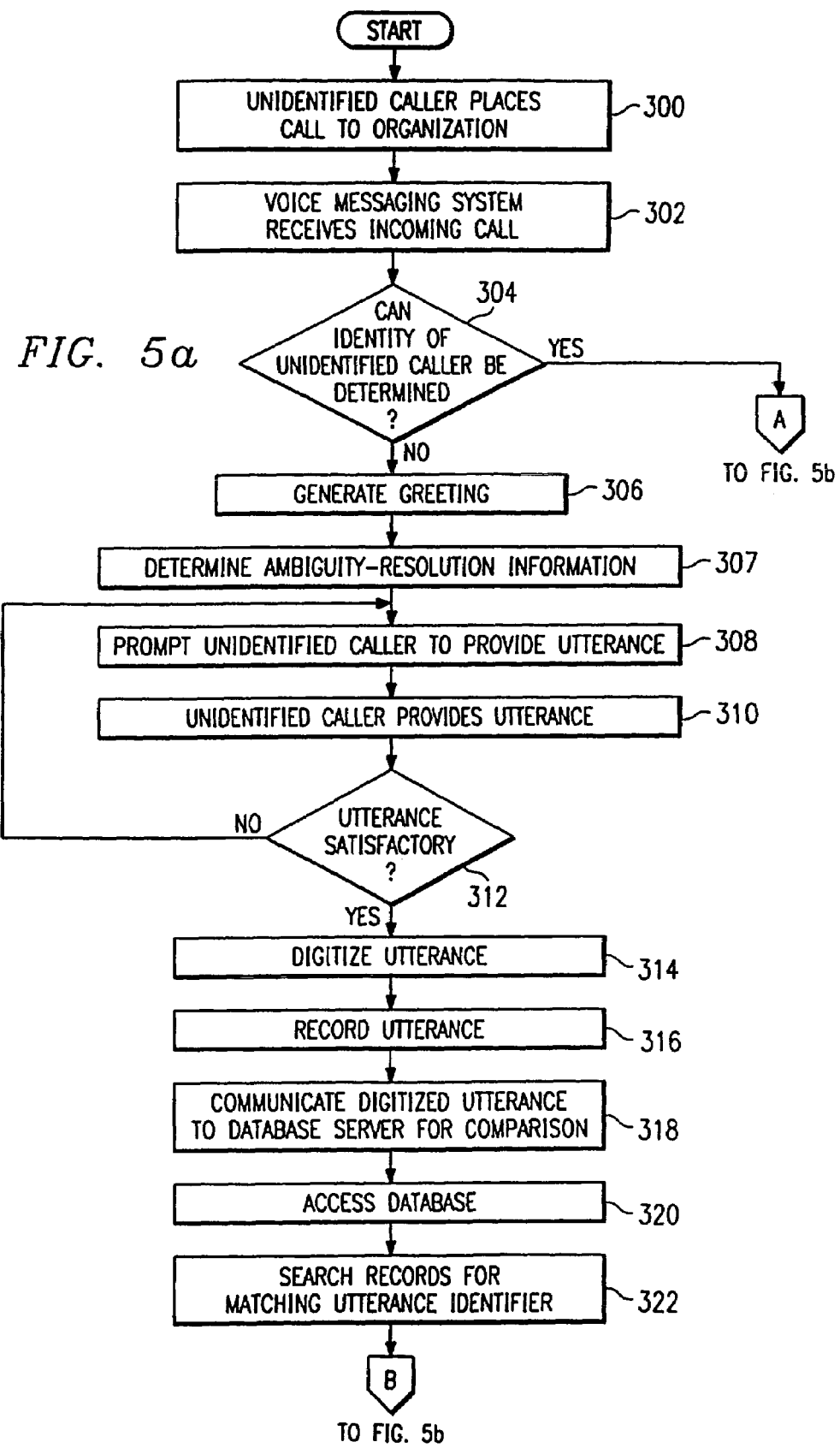
FIGS. 5a and 5b are a flow chart illustrating a method for identifying an unidentified caller in a voice messaging environment.
Figure 5B:
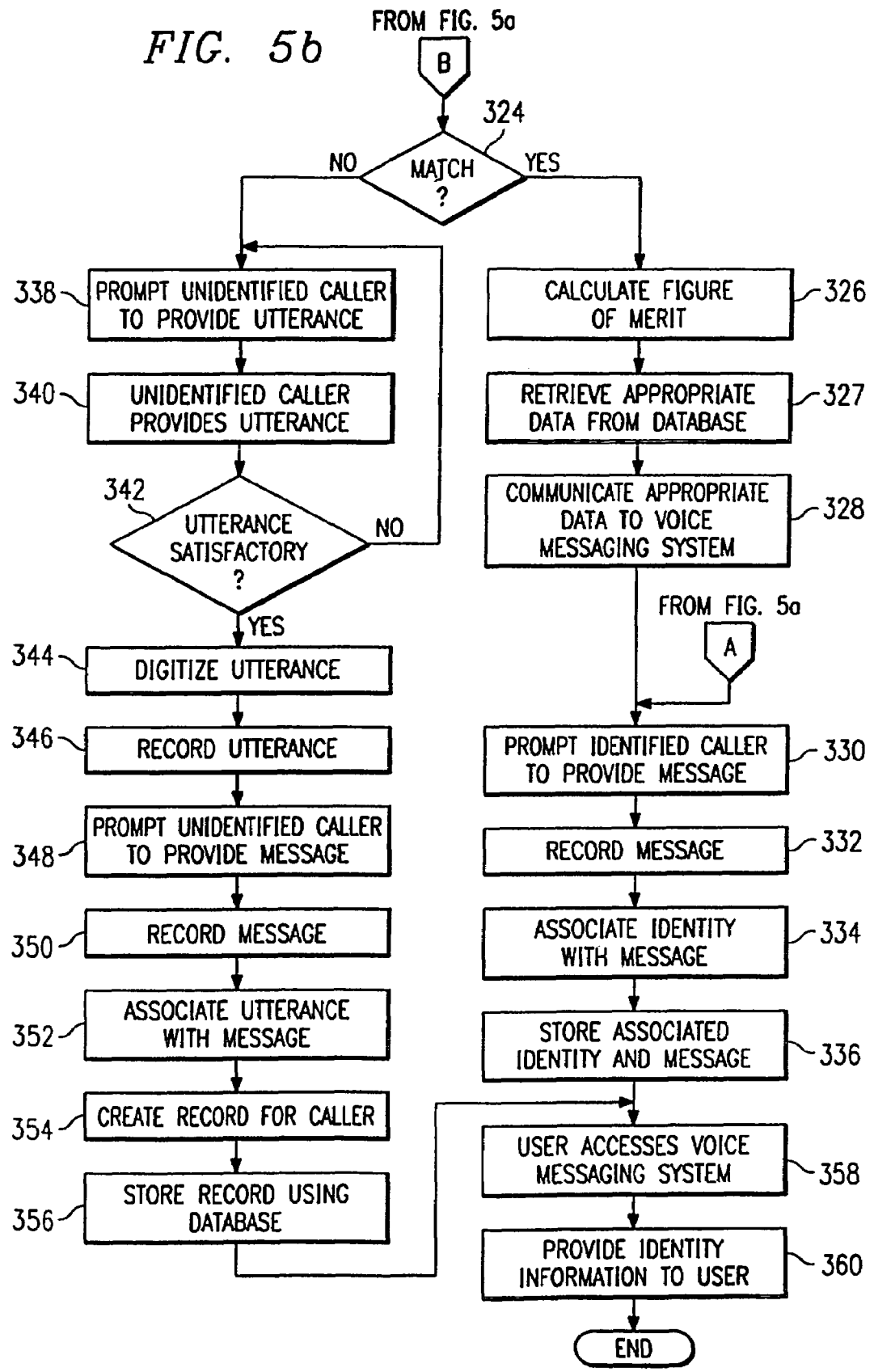

FIGS. 5a and 5b represent a flow chart of a method of identifying an unidentified caller 14 in a voice messaging environment. The method begins at step 300, where an unidentified caller 14 places a call to the organization using network 12 and link 22. Although the present invention contemplates system 9 receiving and processing incoming calls from multiple unidentified callers 14 serially, more or less simultaneously, or in any other temporal relationship, the method is discussed herein with reference to a single unidentified caller 14. Voice messaging system 60 receives the incoming call from unidentified caller 14 at step 302 and, at step 304, determines whether unidentified caller 14 can be identified using one or more conventional techniques. For example, if the incoming call originates from an extension, location, site, account, mail station, or other entity that is integral to voice messaging system 60, such as a computer terminal coupled to an organization PBX, then voice messaging system 60 may identify unidentified caller 14 using information provided by unidentified caller 14 during the sign on process.

If voice messaging system 60 identifies unidentified caller 14 at step 304, based on the origin of the incoming call or otherwise, then the method proceeds to step 330, where voice messaging system 60 prompts unidentified caller 14 to provide a message for subsequent communication to a user of voice messaging system 60. If voice messaging system 60 does not identify unidentified caller 14 at step 304, for whatever reason, then voice messaging system 60 generates a greeting for communication to unidentified caller 14 at step 306 in the manner discussed above in connection with FIGS. 4a and 4b. Before, during, or after generating the greeting at step 306, voice messaging system 60 may use facility 17 to determine a suitable identifier at step 307 for use in resolving an ambiguous identification of unidentified caller 14 as two or more known callers in the manner discussed above with reference to FIGS. 4a and 4b. In one embodiment, the greeting generated at step 306 prompts unidentified caller 14 at step 308 to provide an utterance, for example, any sound, word, or phrase, such as a name or other identifier corresponding to unidentified caller 14, that is suitable for comparison with one or more utterance identifiers 164 corresponding to one or more known callers and stored using database 42 and tables 160.

At step 310, unidentified caller 14 responds by providing the requested utterance. If the utterance is inaudible, improper, or otherwise unsatisfactory at step 312, according to one or more specified parameters, the method returns to step 308, where unidentified caller 14 is again prompted to provide an utterance. If the provided utterance is satisfactory at step 312, voice messaging system 60 digitizes the utterance at step 314 using analog-to-digital conversion facility 13 and records the utterance at step 316 using recording facility 15. Voice messaging system 60 communicates the digitized utterance to database server 34 at step 318 using link 32.

At step 320, database server 34 accesses database 42 using interface 41 and communication parameters 48. At step 322, database server 34 and associated DBMS 43 search database 42 for one or more utterance identifiers 164 that duplicate, resemble, match, correlate with, or otherwise compare favorably to the digitized utterance corresponding to unidentified caller 14, according to one or more match parameters 46. As discussed above with reference to FIGS. 4a and 4b, parametric encoding data 165 may be searched instead of, or in addition to, utterance identifiers 164 to identify unidentified caller 14 from among a universe of known callers. If the digitized utterance corresponding to unidentified caller 14 matches an utterance identifier 164 at step 324, database server 34 may measure, assess, calculate, or otherwise determine a figure of merit for the identification of formerly unidentified caller 14 at step 326 in the manner discussed above. Voice messaging system 60 may use any appropriate ambiguity-resolution criteria in identifying unidentified caller 14 as a particular known caller, as discussed more fully above with reference to FIGS. 4a and 4b.

At step 327, database server 34 and associated DBMS 43 retrieve information from database 42 corresponding to the known caller with which formerly unidentified caller 14 has been identified. The retrieved information may include some or all of the identity data 104 for the known caller, such as a name or other identifier 106 for the known caller, or any other information associated with the particular known caller and contained in database 42. Database server 34 communicates the retrieved information to voice messaging system 60 at step 328. In one embodiment, the figure of merit determined at step 326 is communicated to voice messaging system 60 together with or separately from the retrieved information.

At step 330, voice messaging system 60 prompts formerly unidentified caller 14 to provide a message for subsequent communication to a user of voice messaging system 60. Voice messaging system 60 records any resulting message at step 332, associates the identity of formerly unidentified caller 14 with the recorded message at step 334, and stores the associated identity and recorded message corresponding to formerly unidentified caller 14 at step 336. Voice messaging system 60 may prompt the caller to provide and may record a message before, during, or after the caller provides an utterance for identification purposes. When a user of voice messaging system 60 accesses voice messaging system 60 at step 358, using a telephone connection, an integrated computer system, or in some other suitable manner, voice messaging system 60 may communicate the identity of formerly unidentified caller 14 to the user to indicate that formerly unidentified caller 14 recorded a message using voice messaging system 60.

The present invention contemplates associating the identity of formerly unidentified caller 14 with the recorded message corresponding to formerly unidentified caller 14 before, during, or after the user accesses voice messaging system 60. Voice messaging system 60 may provide the identity of formerly unidentified caller 14 separately from or together with the recorded message corresponding to formerly unidentified caller 14. If multiple unidentified callers 14 have interacted with voice messaging system 60 to provide messages for a user, voice messaging system 60 may provide the user with the identities of the formerly unidentified callers 14 at step 360, in a chronological list or other suitable format, separately from or together with the recorded messages corresponding to the formerly unidentified callers 14.

Voice messaging system 60 may provide the identities and any other information retrieved from database 42 for one or more formerly unidentified callers 14 to the user in any appropriate manner. For example, if voice messaging system 60 is integral to, associated with, or suitably connected to a computer or other processing device such as computer 50, then voice messaging system 60 may provide some or all of the retrieved information using output device 54 or another device suitable for conveying visual information. Alternatively, if voice messaging system 60 is accessed using a telephone only connection, for example, by the user entering a voice mail box number, PBX extension, or other identifier, voice messaging system 60 may audibly convey the retrieved information, in whole or in part. The present invention contemplates any suitable combination of such techniques to provide the identities of one or more formerly unidentified callers 14 for which messages have been recorded to a user of voice messaging system 60.

Voice messaging system 60 may provide the identities of one or more formerly unidentified callers 14, in a chronological list format or otherwise, together with other retrieved or other information concerning formerly unidentified callers 14, the recorded messages corresponding to formerly unidentified callers 14, or any combination of the above. For example, for a recorded message corresponding to formerly unidentified caller 14, voice messaging system 60 might provide, in any suitable relative arrangement, without limitation: the identity of formerly unidentified caller 14; the figure of merit associated with the identification of formerly unidentified caller 14; the total number of recorded messages corresponding to formerly unidentified caller 14; the length of the message; the time, day, and/or date the message was recorded; and any other suitable information concerning formerly unidentified caller 14 or the particular recorded message. Once the user accesses voice messaging system 60 and receives the identities of formerly unidentified callers 14 and any other appropriate information at step 360, the method ends.

In one embodiment, system 9 is self-learning, such that if no match is made at step 324 between the utterance provided by unidentified caller 14 and an utterance identifier 164 corresponding to a known caller, system 9 creates a record 44 for the unidentified caller 14 that may be used to identify a subsequent unidentified caller 14 as the unidentified caller 14 corresponding to the created record 44. For example, database 42 may not contain utterance data 162 suitable to identify unidentified caller 14, because unidentified caller 14 may have had no previous interaction with the organization or voice messaging system 60. Moreover, database 42 may not yet contain utterance data 162 for any known callers, due to the length of time system 9 has been operating or for some other reason. If the identity of unidentified caller 14 is verified in some suitable manner after the created record 44 is generated, the created record 44 for unidentified caller 14 may be used as a record 44 that corresponds to a known caller to identify one or more subsequent unidentified callers 14 in the manner discussed above.

If voice messaging system 60 cannot or does not match or suitably correlate the digitized utterance for unidentified caller 14 with an utterance identifier 164 corresponding to a known caller at step 324, for whatever reason, voice messaging system 60 may prompt unidentified caller 14 to provide an utterance at step 338 in the manner discussed above with reference to step 308. The present invention contemplates voice messaging system 60 using the utterance provided at step 308 instead of, or in addition to, prompting unidentified caller 14 for an utterance at step 338. Unidentified caller 14 provides the requested utterance at step 340 and, if the utterance is satisfactory at step 342, voice messaging system 60 digitizes and records the utterance at steps 344 and 346, respectively. In one embodiment, voice messaging system 60 may also translate the utterance into a format understandable to system 9 using the associated speech recognition capability 23. If the provided utterance is not satisfactory at step 342, the method returns to step 338, where unidentified caller 14 is again prompted to provide an utterance.

Before or after unidentified caller 14 is prompted to provide an utterance at step 338, voice messaging system 60 prompts unidentified caller 14 to provide a message at step 348 for subsequent communication to a user of voice messaging system 60. Voice messaging system 60 records any resulting message at step 350 and associates the utterance, the translated utterance, or both the utterance and translated utterance for unidentified caller 14 with the recorded message at step 352. In conjunction with database server 42 and associated DBMS 43, voice messaging system 60 creates a record 44 for unidentified caller 14 at step 354 and, at step 356, stores the created record 44 in one or more tables 160 within database 42. In one embodiment, the created record 44 for unidentified caller 14 contains an utterance identifier 164 that digitally represents the utterance provided by unidentified caller 14. One or more created records 44 may also contain other utterance data 162 corresponding to the utterance and any other suitable information, whether or not associated with utterance identifier 164.

In one embodiment, the recorded utterance or the translation of the utterance for unidentified caller 14 is used to indicate to a user of voice messaging system 60 that a message corresponding to unidentified caller 14 has been recorded. The created record 44 for unidentified caller 14 is used to identify a subsequent unidentified caller 14 as the particular unidentified caller 14 for which the created record 44 was generated.

When a user of voice messaging system 60 accesses voice messaging system 60 at step 358, voice messaging system 60 may communicate the utterance, the translated utterance, and any other suitable information concerning unidentified caller 14 to the user at step 360 using any of the techniques discussed above. For example, if voice messaging system 60 is integral to, associated with, or suitably connected to a computer or other processing device such as computer 50, then voice messaging system 60 may provide a translation of the utterance, generated using speech recognition capability 23, to the user using output device 54 or another device suitable for conveying visual information. Alternatively, if voice messaging system 60 is accessed using a telephone only connection, for example, by the user entering a voice mail box number, PBX extension, or other identifier, voice messaging system 60 may audibly convey the utterance to the user.

Voice messaging system 60 may provide utterances or translated utterances for one or more unidentified callers 14, in a chronological list format or otherwise, together with or separately from: any other suitable information concerning unidentified callers 14; the recorded messages corresponding to unidentified callers 14; the identities of formerly unidentified callers 14; any other information concerning formerly unidentified callers 14; the recorded messages corresponding to formerly unidentified callers 14; or any combination of the above. After system 9 has provided this information to the user at step 360, the method ends.

Figure 6:
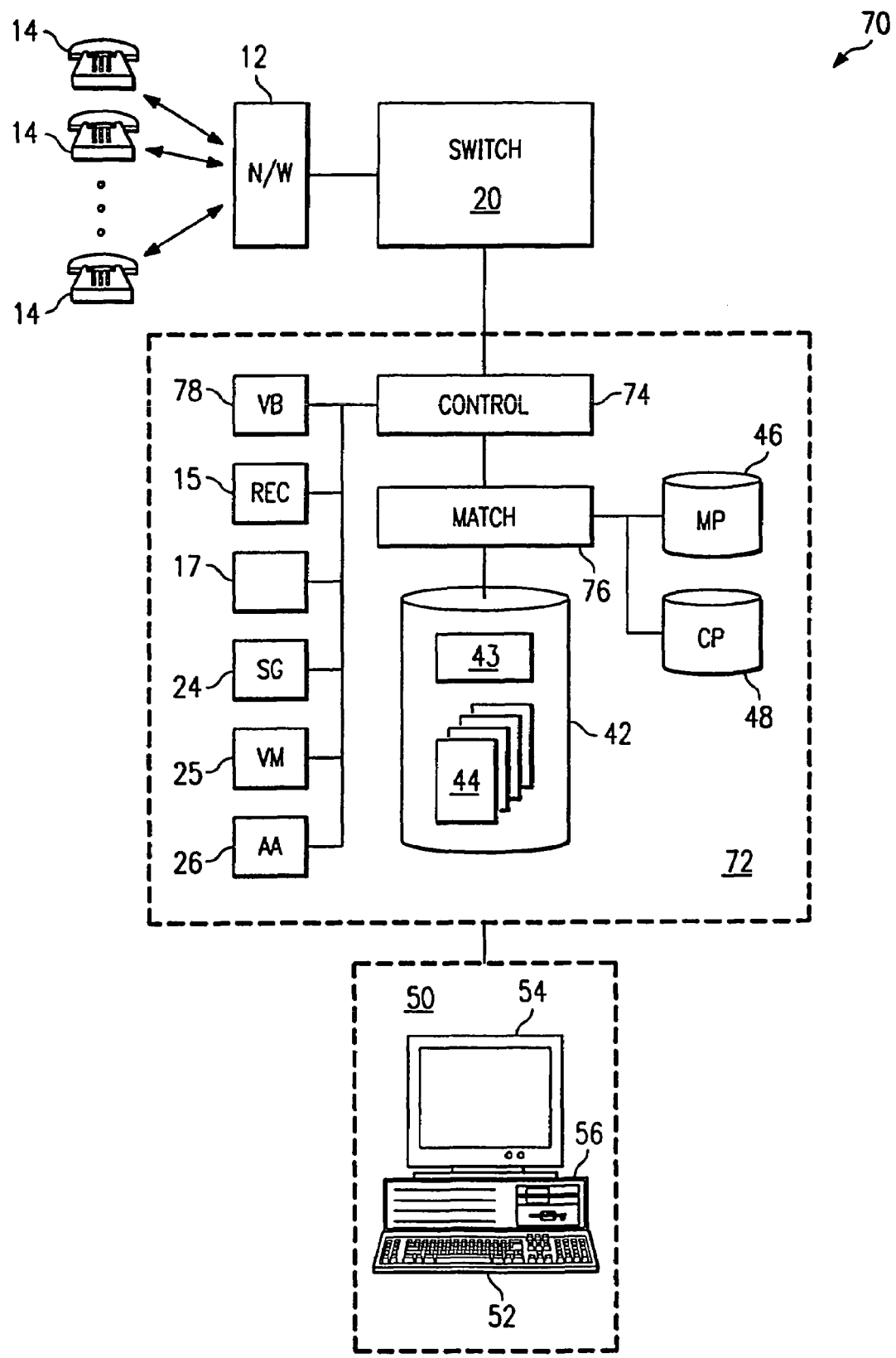
FIG. 6 illustrates a computer-based system for identifying an unidentified caller.

FIG. 6 illustrates an exemplary computer-based system 70 for identifying an unidentified caller 14 that includes network 12, switching system 20, and processing system 72. Processing system 72 may include, without limitation: a control module (CONTROL) 74, a match module (MATCH) 76, a voice board 78, recording facility 15, facility 17, speech generation capability 24, voice messaging capability 25, automated attendant capability 26, match parameters 46, communications parameters 48, database 42, and any other suitable components. In one embodiment, processing system 72 operates on a called party's personal or other computer 50 in a home setting, business or other organizational setting, or any other suitable environment to provide some or all of the functionality discussed above with reference to FIG. 1. The present invention contemplates: some or all of switching system 20 being integral to computer 50; processing system 72 distributed to operate on multiple computers 50 or telephone units at one or more locations; components of processing system 72, such as database 42, being integral to or separate from processing system 72; or processing system 72, computer 50, switching system 20, or any combination of the above being integral to a called party's telephone unit. Those skilled in the art will appreciate that other suitable arrangements may be devised without departing from the intended scope of the present invention.

Voice board 78 includes appropriate circuitry for detecting ringing signals or other call origination signals and for performing analog-to-digital or digital-to-analog conversion, as the case may be. Voice board 78 is of a type well known in the art and may be in the form of a computer-oriented modem, in the form of a specialized voice board of the type manufactured by DIALOGIC CORPORATION or RHETORIX CORPORATION and used for computer telephony integration (CTI), or in any other suitable form. Voice board 78 may replace or combine with analog-to-digital conversion facility 13 shown in FIG. 1. Analog-to-digital conversion may alternatively be performed using capabilities associated with switching system 20. Match module (MATCH) 76 performs functionality discussed above with reference to FIG. 1 for identifying unidentified callers 14 by comparing utterance information for unidentified callers 14 with stored utterance data 162 for known callers. Control module (CONTROL) 74 coordinates communications between various components of processing system 72 according to the operation of processing system 72 and system 70. Using the capabilities discussed above, system 70 identifies one or more unidentified callers 14 and, in response, provides one or more call routing options to a called party. System 70 may use ambiguity-resolution criteria in the manner discussed above with reference to FIGS. 4a and 4b. The present invention contemplates processing system 72 routing calls in a pre-programmed manner according to the identification of some or all unidentified callers 14.

Figure 7A:
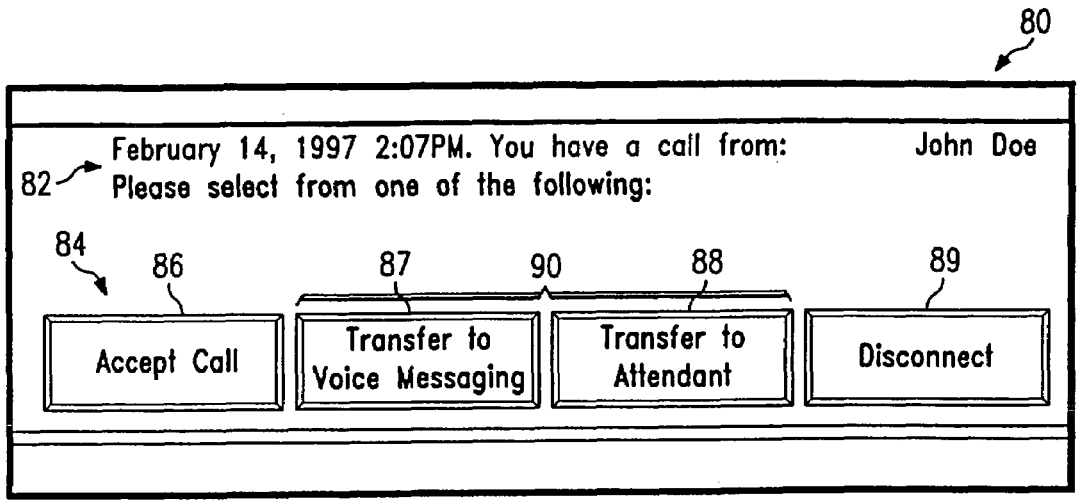
FIG. 7a through 7d illustrate exemplary option screens.

FIGS. 7a through 7d illustrate option screens that processing system 72 may present to the called party using output device 54 of computer 50, a liquid crystal display (LCD) or light emitting diode (LED) display associated with a telephone unit, or in any other suitable manner according to the operation of processing system 72 and activities of the called party. FIG. 7a illustrates first option screen 80 that is presented to the called party in response to processing system 72 receiving an incoming call from unidentified caller 14, receiving an utterance from unidentified caller 14, and identifying unidentified caller 14 as a particular known caller, possibly using one or more ambiguity-resolution criteria. First option screen 80 includes textual information 82 that may include the date and time, the identity of formerly unidentified caller 14, an instructional or other message, and any other suitable information, in any combination. First option screen 80 also includes call routing options 84, which are presented to the called party in the form of window buttons, as shown in FIG. 7a, as numbered options, or in any other appropriate form. The present invention contemplates some or all of the information associated with first option screen 80 being presented to the called party audibly in addition to or instead of visually.

In one embodiment, call routing options 84 include: (1) an accept option 86 that the called party selects to accept the call from formerly unidentified caller 14; (2) a voice messaging option 87 that the called party selects to transfer the call or otherwise leave a message to voice messaging capability 25; (3) an attendant option 88 that the called party selects to transfer the call to a secretary or other assistant or to automated attendant capability 26, as the case may be; (4) a disconnect option 89 that the called party selects to disconnect the call; and (5) any other call routing options 84. Voice messaging capability 25 may be a message recording facility either collocated with or remote from the called party and the associated computer 50 or telephone unit. Collectively, voice messaging option 87 and attendant option 88 may be referred to as transfer option 90. The functionality associated with attendant option 88 may be separated among multiple transfer options 90. The called party may select from among call routing options 84 using a mouse or other suitable pointer to select an appropriate window button on output device 54, using a keyboard such as input device 52 of computer 50 to enter an appropriate number or letters, or using any other suitable technique for indicating a selection. Processing system 72 may route calls from one or more formerly unidentified callers 14 according to pre-programmed routing information in response to identifying unidentified callers 14 as known callers.

Figure 7B:
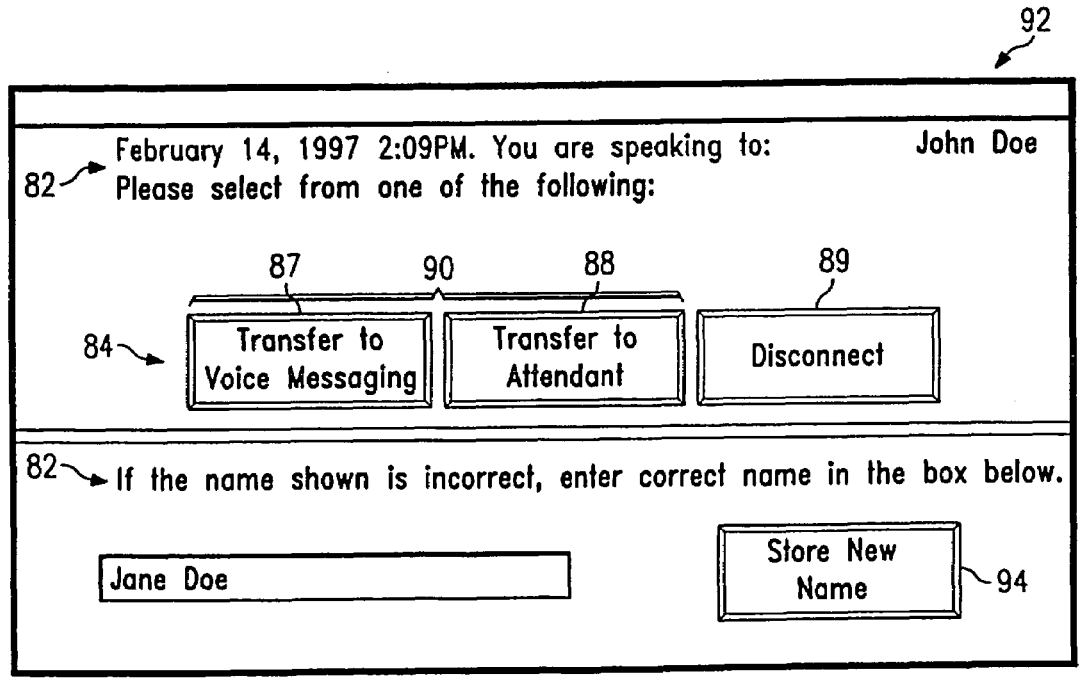

FIG. 7b illustrates second option screen 92 that is presented to the called party in response to the called party selecting accept option 86 associated with first option screen 80. Similar to first option screen 80, second option screen 92 includes textual information 82 and suitable call routing options 84, which may include voice messaging option 87, attendant option 88, disconnect option 89, and any other appropriate call routing options 84. As a result, the called party maintains real-time control over the call even after accepting the call, which provides an important technical advantage of the present invention. As discussed above, the called party may select from among call routing options 84 using a mouse or other suitable pointer to select an appropriate window button on output device 54, using a keyboard such as input device 52 of computer 50 to enter an appropriate number or letters, or using any other suitable technique.

In one embodiment, second option screen 92 includes textual information 82 that instructs the called party to provide a corrected identity if the formerly unidentified caller 14 was identified incorrectly, because the formerly unidentified caller 14 provided an utterance sufficiently different from one or more previous utterances for formerly unidentified caller 14 or for any other reason. For example, and not by way of limitation, unidentified caller 14 may have a changed name, a medical or other condition, or a relatively poor transmission facility. After the called party types, speaks, or otherwise enters or provides a corrected identity, assuming one is necessary, the called party may cause processing system 72 to store the corrected identity of formerly unidentified caller 14 with utterance information that processing system 72 used to incorrectly identify the formerly unidentified caller 14 in database 42, as name 106 and corresponding utterance identifier 164. The called party may use a store window button 94 on output device 54, keys on input device 52, or any other suitable technique to store the corrected identity and utterance information.

Figure 7C:
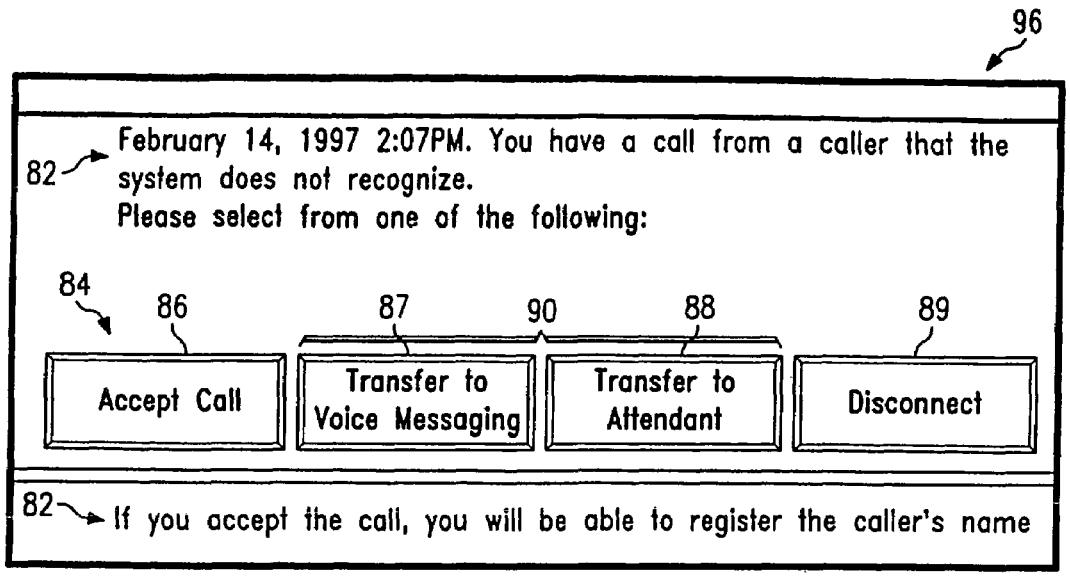

FIG. 7c illustrates third option screen 96 presented to the called party in response to processing system 72 receiving an incoming call from unidentified caller 14, receiving an utterance from unidentified caller 14, and being unable to adequately identify unidentified caller 14 or to resolve an ambiguous identification of unidentified caller 14 using appropriate criteria. Similar to first option screen 80, third option screen 96 includes textual information 82 and suitable call routing options 84, which may include accept option 86, voice messaging option 87, attendant option 88, disconnect option 89, and any other appropriate call routing options 84. In one embodiment, textual information 82 may explain to the called party that the called party may register the identity of unidentified caller 14 after selecting accept option 86 and identifying unidentified caller 14 through personal interaction, as discussed more fully below.

Figure 7D:
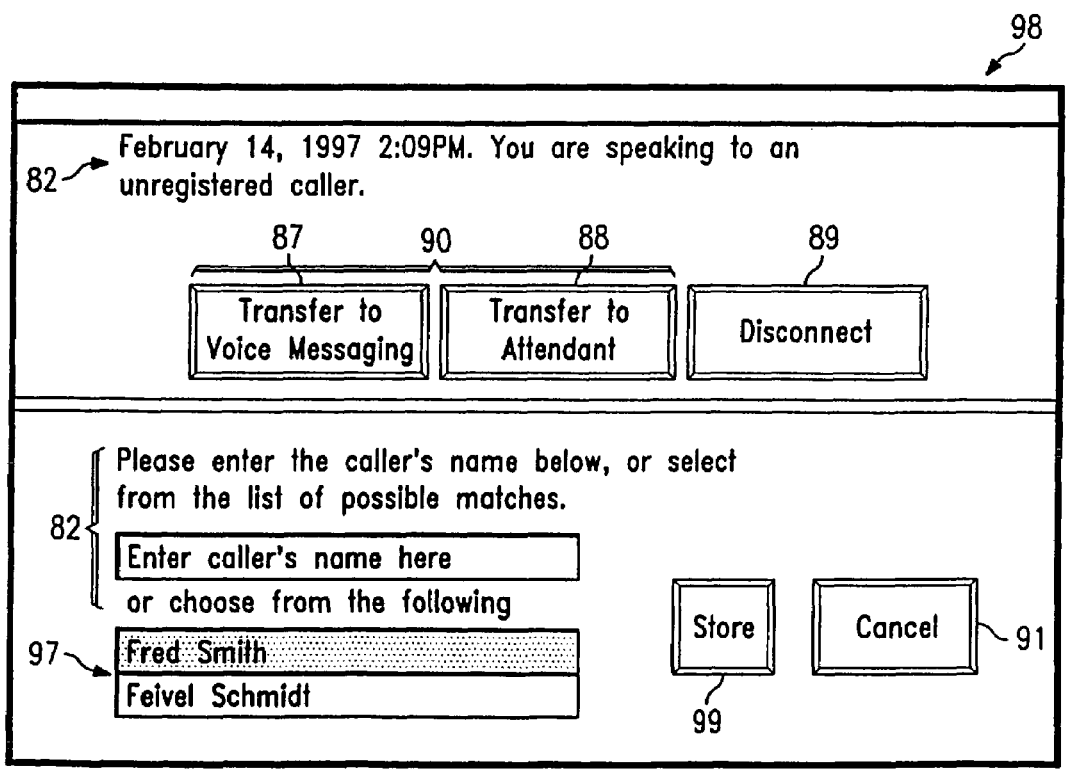

FIG. 7d illustrates fourth option screen 98 that is presented to the called party in response to the called party selecting accept option 86 associated with third option screen 96. Similar to second option screen 92, fourth option screen 98 includes textual information 82 and appropriate call routing options 84, which may include voice messaging option 87, attendant option 88, disconnect option 89, and any other appropriate call routing options 84. As discussed above, the called party maintains real-time control over the call even after accepting the call, providing an important technical advantage of the present invention. In one embodiment, fourth option screen 98 includes textual information 82 that instructs the called party to provide the identity of unidentified caller 14 for registering unidentified caller 14 with processing system 72. Textual information 82 may also invite the called party to select a name from a list 97 of known callers who might possibly be unidentified caller 14, based upon the similarity of the utterance information for unidentified caller 14 to stored utterance identifiers 164 for the known callers, but for whom no match could be made to within the predetermined accuracy threshold. As discussed above, one or more ambiguity-resolution criteria may be used to further narrow the universe of known callers with which unidentified caller 14 may be identified.

After the called party provides the identity of unidentified caller 14 or selects the identity of a known caller from list 97, the called party may cause processing system 72 to store the identity as a new name 106 in table 160 with the utterance information for unidentified caller 14 or, if a known caller is selected from list 97, to store the utterance information as an utterance identifier 164 associated with name 106 for the known caller. The called party may register the formerly unidentified caller 14 using a store window button 99 on output device 54, keys of input device 52, or any other suitable technique. The called party may also select a cancel window button 91 or otherwise indicate that the called party does not wish to register formerly unidentified caller 14 with processing system 72. As the above discussion indicates, the present invention may be self-learning to increase the likelihood that processing system 72 will correctly identify the formerly unidentified caller 14 the next time the formerly unidentified caller 14 calls.

Figure 8A:
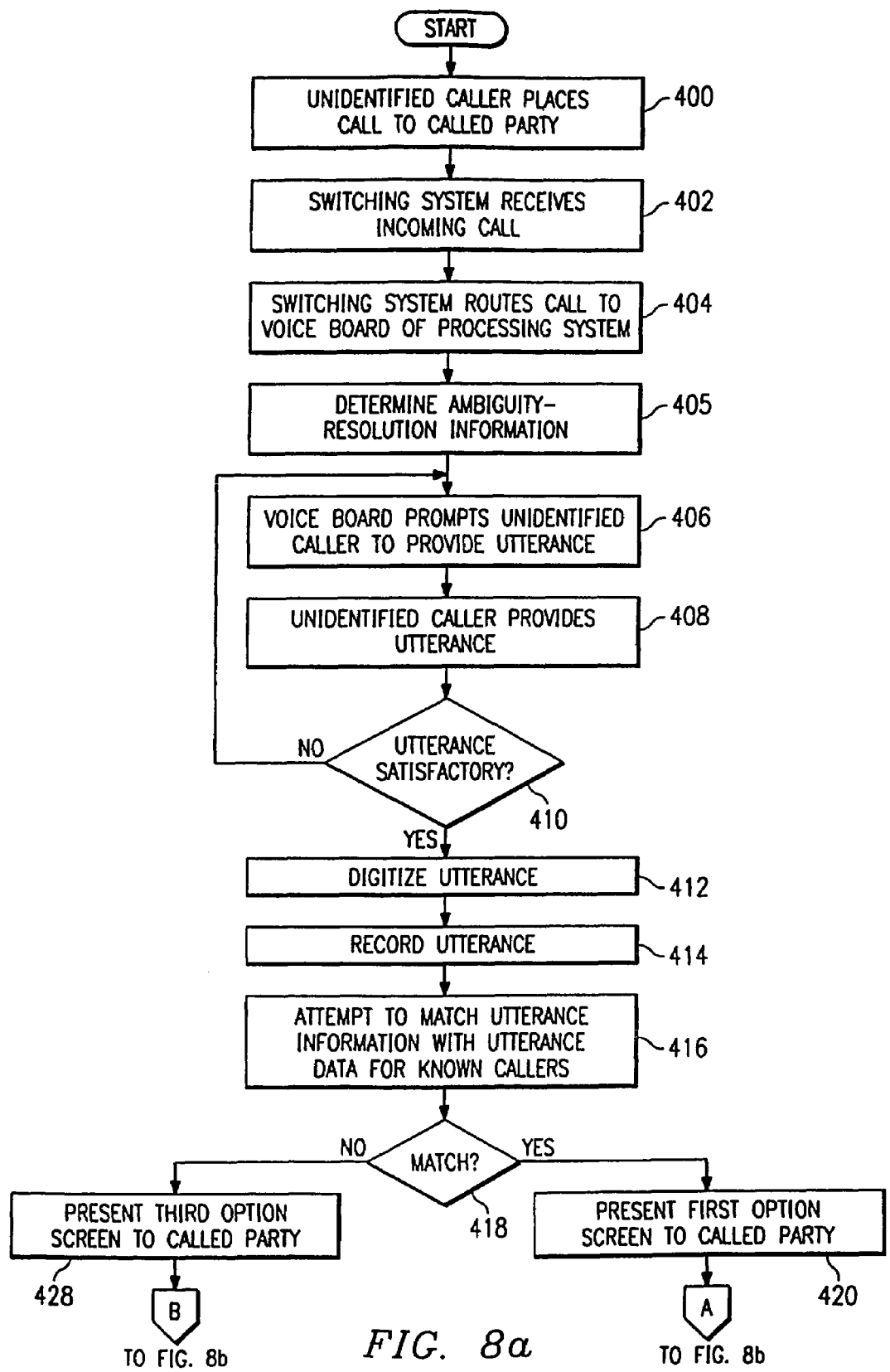

FIGS. 8a and 8b are a flow chart illustrating an exemplary method of identifying an unidentified caller 14. The method begins at step 400, where unidentified caller 14 places a call to the called party, who may be in a home, business or organizational, or any other suitable setting, using network 12 and link 22. Although system 70 may receive and process calls from one or more unidentified callers 14 serially, more or less simultaneously, or in any other temporal relationship, the method is discussed with reference to a single unidentified caller 14. At step 402, switching system 20 receives the incoming call and, at step 404, routes the call to voice board 78 of processing system 72. In response to receiving the incoming call at step 402, system 70 also determines one or more identifiers at step 405 for use as ambiguity-resolution information in the manner discussed above. Voice board 78 audibly prompts unidentified caller 14 to provide an utterance at step 406 and, at step 408, unidentified caller 14 provides the requested utterance. As discussed above, the utterance may be any sound, word, or phrase, such as the name of unidentified caller 14, suitable for being digitized and compared with previously stored utterance identifiers 164 corresponding to one or more known callers.

If the utterance provided by unidentified caller 14 at step 408 is inaudible, improper, or unsatisfactory at step 410, according to one or more specified parameters, the method returns to step 406, where voice board 78 again prompts unidentified caller 14 to provide an utterance. If the utterance is satisfactory at step 410, voice board 78 digitizes the utterance at step 412 and processing system 72 records the digitized utterance for unidentified caller 14 at step 414 using recording facility 15. At step 416, match module 76 of processing system 72 attempts to match the digitized utterance for unidentified caller 14 with an utterance identifier 164 contained in database 42 in the manner discussed more fully above. One or more ambiguity-resolution criteria may be used. If a match is found for the digitized utterance at step 418, processing system 72 presents first option screen 80 and the associated call routing options 84 to the called party at step 420, using output device 54 of computer 50, an LCD or LED display associated with the called party's telephone unit, audibly using a speaker or "head set" associated with computer 50, or in any other appropriate manner.

If the called party accepts the call at step 422, for example, by selecting accept option 86 using a mouse or other pointer, keys on input device 52 of computer 50, or in any other suitable manner, processing system 72 connects the called party to formerly unidentified caller 14 at step 424. Processing system 72 may connect unidentified caller 14 to the called party, for example, by coupling the phone line to a microphone and speakers associated with computer 50 or the called party's telephone unit, to a "head set" associated with computer 50 or the called party's telephone unit, or using any other appropriate technique. At step 426, processing system 72 presents the called party with second option screen 92, which may be presented as an entirely new screen on output device 54 or as a modified version of first option screen 80.

If the called party does not accept the call at step 422, and instead selects another call routing option 84 for the call, processing system 72 transfers or disconnects the call at step 432 according to the call routing option 84 selected, and the method ends. For example, if voice messaging option 87 is selected, formerly unidentified caller 14 is transferred to voice messaging capability 25 through a "switch hook transfer," telecommunications API (TAPI), TSAPI, or ISDN commands, or any other appropriate mechanism. If voice messaging system 25 is integral to computer 50, transfer may be unnecessary and processing system 72 may invoke voice messaging capability 25 more or less directly. Alternatively, if the called party selects attendant option 88, formerly unidentified caller 14 is routed to an assistant, to automated attendant capability 26, or to any other suitable predetermined destination. As discussed above, this transfer may be performed according to a "switch hook transfer" or standard commands. Another alternative for the called party is to select disconnect option 89 to disconnect the call. The present invention contemplates other call routing options 84 as alternatives to accept option 86. Processing system 72 may also route calls from some or all unidentified callers 14 according to preprogrammed call routing information in response to the identification of unidentified callers 14.

If formerly unidentified caller 14 has been identified in error at step 434, for whatever reason, the called party may provide a corrected identity at step 436 and store the corrected identity with the utterance information for the formerly unidentified caller 14 at step 438, using store window button 94 or any other suitable technique, as name 106 and corresponding utterance identifier 164 in database 42. Since the called party maintains real-time control over the call even after accepting the call, the called party may select a transfer option 90 or disconnect option 89 at step 440 according to particular needs, in which case the method proceeds to step 432. Alternatively, the call may proceed at step 442 until terminated in some manner at step 444, for example, when the call reaches its natural conclusion and the called party hangs up, in which case the method ends. Steps 440 through 444 are repeated more or less continually until the called party transfers the call, disconnects the call, or the call is terminated in some other manner. If formerly unidentified caller 14 was not identified in error at step 434, the method proceeds to step 440 directly. Steps 434 through 444 may occur in any relative sequence according to the operation of processing system 72 and the actions of the called party.

If processing system 72 is unable to find a match or resolve an ambiguous identification at step 418, processing system 72 presents third option screen 96 and associated call routing options 84 to the called party using output device 54 or in any other suitable manner at step 428. If the called party selects a transfer option 90 or disconnect option 89 rather than selecting accept option 86 at step 430, then processing system 72 transfers or disconnects the call at step 432 according to the selected call routing option 84, and the method ends. If the called party selects accept option 86 at step 430, processing system 72 presents the called party with fourth option screen 98 at step 446. If fourth option screen 98 includes a list 97 of one or more known callers for which utterance identifiers 164 possibly match the utterance information for the formerly unidentified caller 14 at step 448, and one of the known callers is in fact the formerly unidentified caller 14, the called party may select the identity of a particular known caller at step 450. At step 452, the called party may store the utterance information for the formerly unidentified caller 14 with name 106 for the corresponding known caller in database 42, and the method proceeds to step 440, where the called party may exercise real-time control over the call by selecting a call routing option 84.

If fourth option screen 98 does not include a list 97 of one or more known callers for which stored utterance identifiers 164 possibly match the utterance information for formerly unidentified caller 14, or if no known caller in list 97 is in fact the formerly unidentified caller 14, the called party may register formerly unidentified caller 14 with processing system 72 at step 454. The called party may type, speak, or otherwise enter the identity of the formerly unidentified caller 14 at step 456 and, at step 458, may store the utterance information for the formerly unidentified caller 14 with the identity of the formerly unidentified caller 14 in database 42 as name 106 and corresponding utterance identifier 164. The method then proceeds to step 440, where the called party may exercise real-time control over the call. If the called party does not elect to register the formerly unidentified caller 14 with processing system 72 at step 454, the method proceeds directly to step 440.

Figure 9:
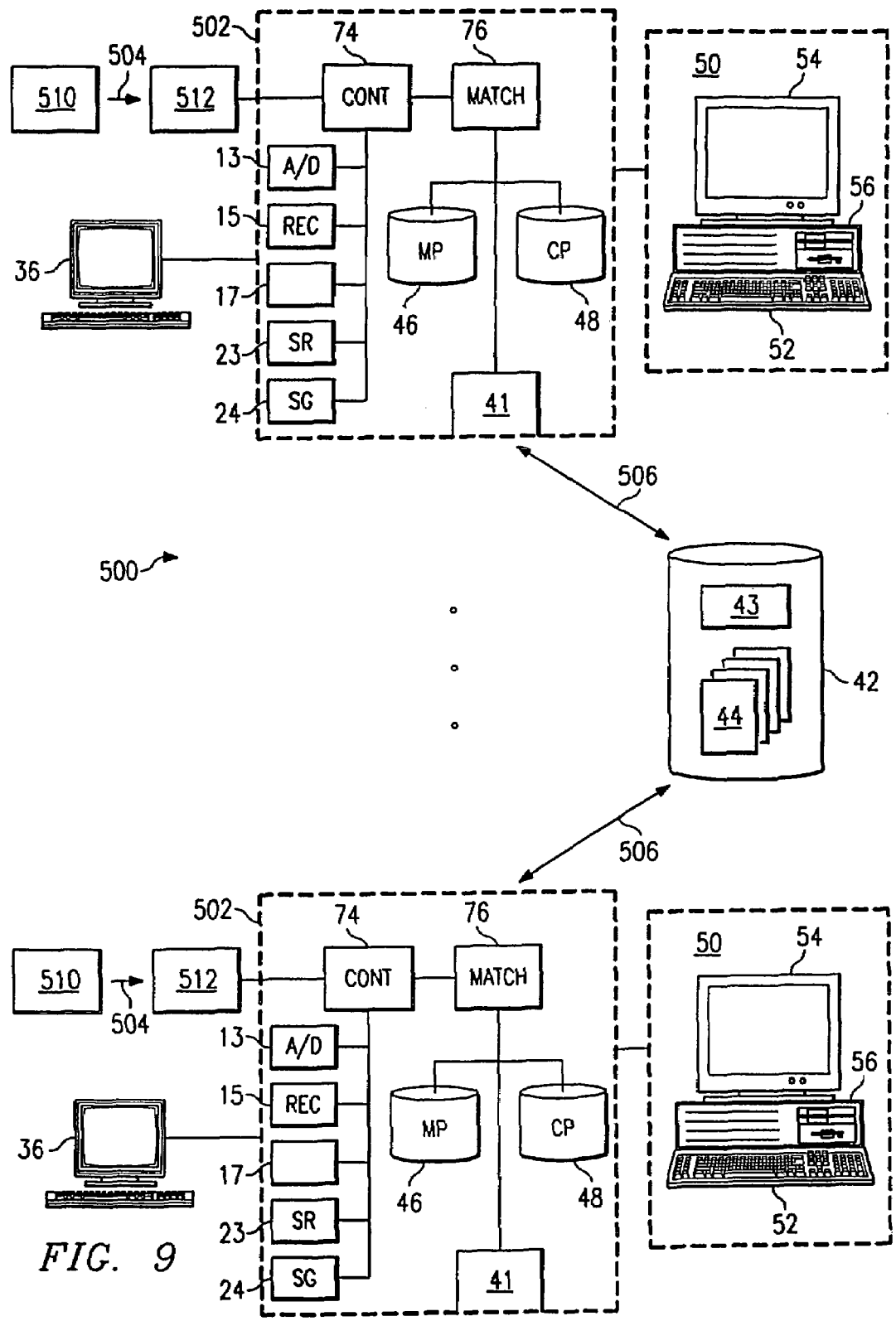
FIG. 9 illustrates a system for identifying an unidentified customer at the point of sale.

FIG. 9 illustrates an exemplary system 500 for identifying one or more unidentified customers 510 at the point of sale. System 500 includes one or more processing systems 502, each operating on a computer 50 and coupled to a voice input device 512, to database 42, and possibly to an agent 36. Voice input device 512 may be a telephone coupled to system 500 using an appropriate network, a microphone, or other suitable voice input device. Agents 36 are discussed more fully above and may be autonomous or operated by one or more employees, representatives, operators, or other individuals associated with the establishment or organization that may interact in some manner with unidentified customers 510 before, during, and after the identification process.

Each processing system 502 includes, without limitation: control module 74, match module 76, analog-to-digital conversion facility 13, recording facility 15, a conventional or other suitable speech recognition facility (SR) 23 of the type known to those skilled in the art, speech generation capability 24, match parameters 46, communications parameters 48, interface 41, and any other components discussed above. Using these and any other suitable components, system 500 identifies one or more unidentified customers 510 at the point of sale from among a universe of known customers, using one or more ambiguity-resolution criteria if appropriate, to provide access to goods, services, and any other suitable benefits. In a particular embodiment, some or all of the components of system 500, such as voice input device 512, processing system 502, agent 36, and database 42, may be integral to an automated teller machine (ATM) that dispenses currency to, receives deposits from, and provides any other suitable banking transactions for patrons of a corresponding banking establishment.

In one embodiment, each processing system 502 within system 500 operates on one or more computers 50 at a particular point of sale to provide functionality discussed above with reference to FIG. 1. Database 42 may be replicated in whole or in part at each point of sale or may be located remotely from processing systems 502 at a centralized location, for example, a centralized point of sale or organizational headquarters. The present invention contemplates multiple processing systems 502 at multiple points of sale operating on the same distributed computer 50 and contemplates database 42 being integral to or separate from one or more processing systems 502. When database 42 is remote from processing system 502, processing system 502 communicates with database 42 using interface 41 and any suitable wireline or wireless link 506, as discussed above.

For purposes of this discussion, a point of sale may include any commercial or other establishment or location, or portion thereof, at which one or more customers 510 may purchase, rent, otherwise receive, or order a tangible or intangible item, for example, a good, service, or other benefit. For example, the point of sale associated with a particular processing system 502 may be a video rental point of sale, a grocery store point of sale, a banking point of sale, such as an ATM point of sale, a department store point of sale, a gasoline station point of sale, a dry cleaning point of sale, or any other appropriate point of sale. Moreover, the point of sale may be a Social Security Administration point of sale, a Department of Health and Human Services point of sale, Federal job training center point of sale, or other point of sale at which monetary or other governmental benefits are provided. Recipients of such benefits are considered customers for purposes of this discussion.

A single establishment or location, such as a large department store, may include multiple points of sale, for example, at each cash register in the store. The point of sale may also be a telephone or personal computer in a home, business, or other suitable setting that includes the requisite components and from which items or other benefits may be purchased, rented, ordered, or otherwise requested. For example, unidentified customer 510 may call or dial in from a telephone or personal computer point of sale in the home to purchase an item, in which case the identification process may be performed at the point of sale, at the other end of the link associated with the organization from which the item is purchased, or at some other remote location. Those skilled in the art will appreciate that system 500 may operate in connection with other suitable points of sale without departing from the intended scope of the present invention.

Communications from unidentified customers 510 to processing systems 502, represented by arrows 504, may be conventional speech communications, speech communications transmitted using an appropriate wireless communications technique, or any other suitable verbal communications. These communications are received at voice input device 512 and converted into electrical signals for use by processing system 502 in identifying unidentified customer 510 from among a universe of known customers at the point of sale. As discussed above, processing system 502 may perform the customer identification local to or remote from the point of sale.

Figure 10A:
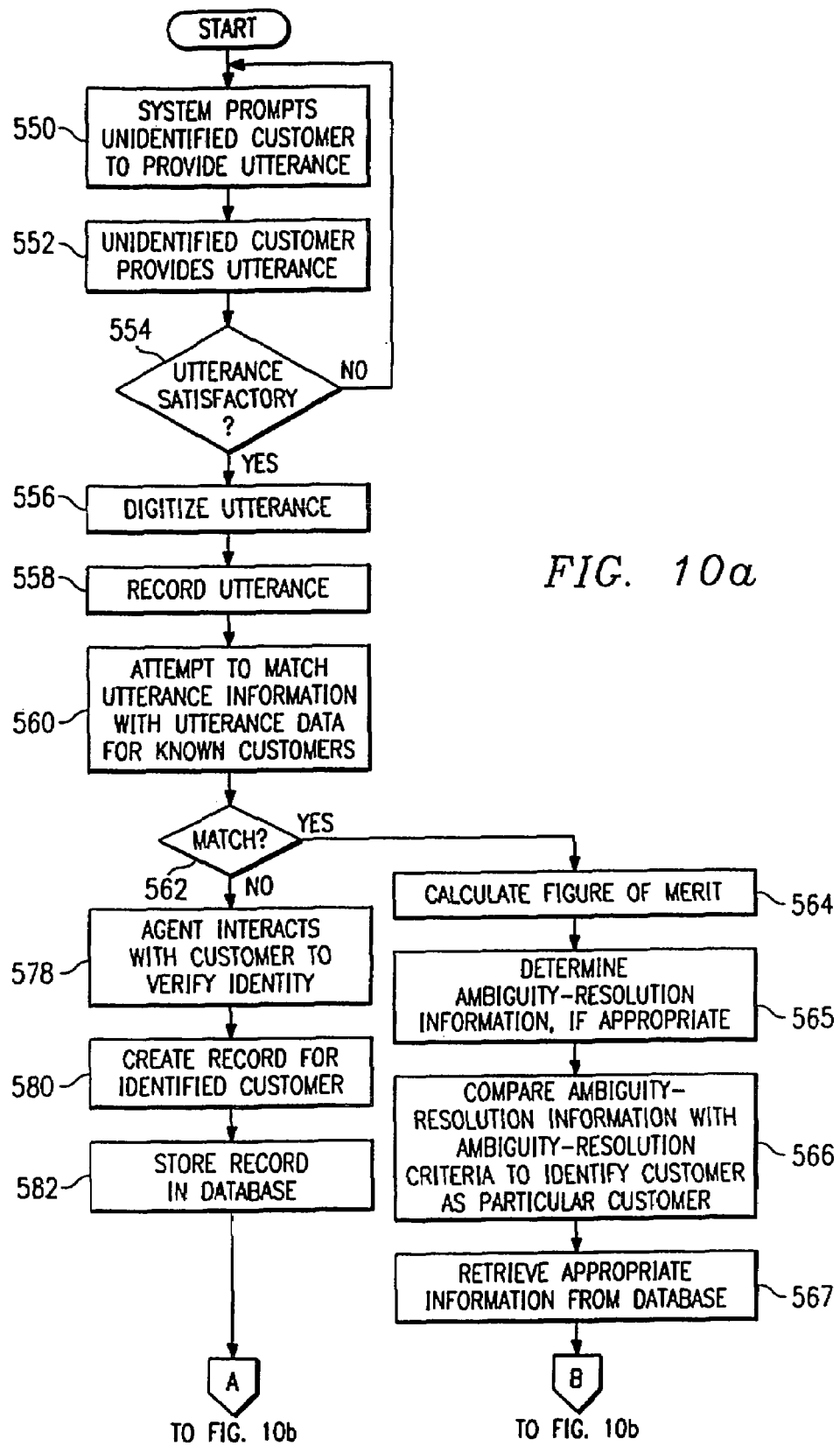
FIGS. 10a and 10b are a flow chart illustrating a method for identifying an unidentified customer at the point of sale.
Figure 10B:
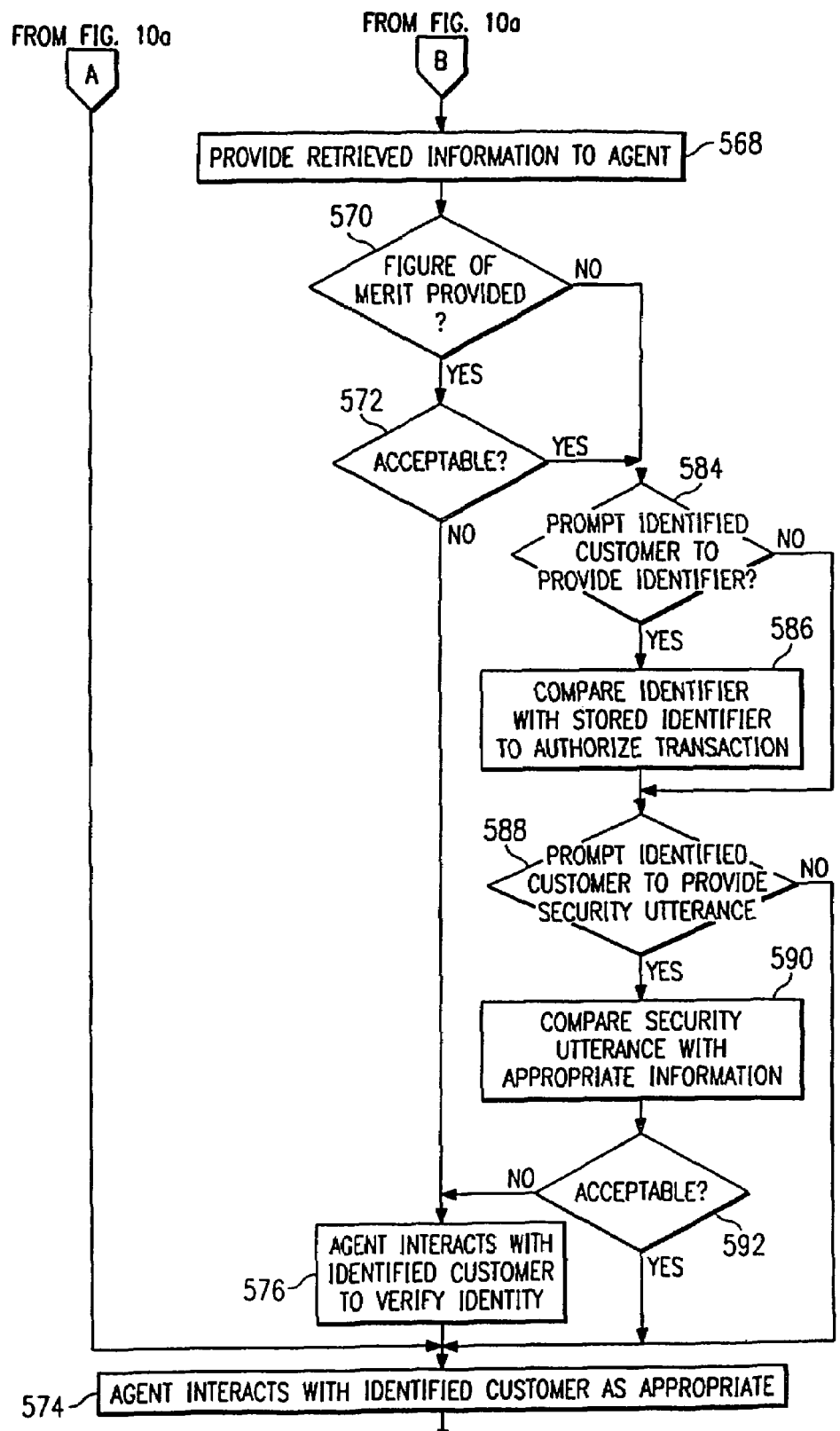

FIGS. 10a and 10b are a flow chart illustrating an exemplary method of identifying one or more unidentified customers 510 at the point of sale. The method begins at step 550, where agent 36 or another suitable component of system 500 may audibly or visually prompt unidentified customer 510 to provide an utterance at the point of sale. At step 552, unidentified customer 510 provides the requested utterance. As discussed above, the utterance may be any sound, word, or phrase, such as the name of unidentified customer 510, suitable for being digitized and compared with previously stored utterance identifiers 164 corresponding to one or more known customers. If the utterance that is provided by unidentified customer 510 at step 552 is inaudible, improper, or unsatisfactory at step 554, in accordance with one or more specified parameters, the method returns to step 550, where system 500 again prompts unidentified customer 510 to provide an utterance. If the utterance is satisfactory at step 554, processing system 502 digitizes the utterance at step 556 and records the digitized utterance at step 558 in the manner discussed above.

At step 560, processing system 502 attempts to match the digitized utterance for unidentified customer 510 with an utterance identifier 164 contained in database 42 in the manner discussed more fully above. If a match is found for the digitized utterance at step 562, processing system 502 may measure, assess, calculate, or otherwise determine a figure of merit for the match at step 564. In a particular embodiment, one or more ambiguity-resolution criteria in records 44 may be used at steps 565 and 566 to resolve an ambiguous identification of unidentified customer 510 as two or more known customers in the manner discussed above. Ambiguity-resolution criteria may also be used to verify an unambiguous identification of customer 510 as a particular known customer.

For example, at step 565, system 70 may determine a location, number, or other identifier associated with a point of sale in a commercial establishment, government office, or other premises at which unidentified customer 510 seeks a good, service, or other benefit. At step 566, system 70 compares the identifier determined at step 565 with an identifier 119 contained in records 44 for one or more known customers with which customer 510 has been identified. Customer 510 is identified as the particular known customer for which the identifier determined at step 565 is consistent with identifier 119, thereby resolving the ambiguity or verifying the unambiguous identification. The goods, services, or benefits customer 510 is seeking may be compared with historical purchasing information 121 for one or more known customers to resolve an ambiguous identification or verify an unambiguous identification, as the case may be. The present invention contemplates using any suitable ambiguity-resolution criteria in connection with system 70 to perform these functions at the point of sale or remote from the point of sale.

At step 567, processing system 502 and DBMS 43 cooperate to retrieve information from database 42 that corresponds to the known customer with which formerly unidentified customer 510 has been identified. Although identity data 104, order data 132, utterance data 162, and other data contained in database 42 is discussed above in connection with callers, database 42 may contain analogous information for one or more known customers instead of or in addition to information concerning known callers.

The retrieved information may include some or all of the identity data 104, order data 132, or utterance data 162 for the known customer; banking, purchase, account or other data for the known customer; or any other suitable information associated with the known customer and contained in database 42. In one embodiment, this other information retrieved from database 42 may include some or all of historical purchasing information 121 for formerly unidentified customer 510 that evidences or reflects dates; times; frequencies; amounts; brands; product types; a PIN, password, or other identifier used to authorize all or particular types of transactions; and any other historical purchasing information, in any combination. Although purchasing information is discussed, this information may include any information associated with the provision or receipt of a tangible or intangible benefit, however such benefit is transferred, with or without consideration. The retrieved information is then provided to agent 36 at the point of sale at step 568 using any suitable "screen popping" or other technique discussed more fully above.

As discussed more fully above, processing system 502 may calculate or otherwise determine a figure of merit at step 564 to indicate the extent of the correlation or the certainty of the match between the digitized utterance for formerly unidentified customer 510 and the utterance identifier 164 for the particular known customer with which formerly unidentified customer 510 has been identified. In one embodiment, the figure of merit is communicated to agent 36 along with the retrieved information for the particular known customer. If either a figure of merit has not been provided at step 570, or has been provided at step 570 and is deemed acceptable by agent 36 or processing system 502 at step 572 in accordance with one or more specified parameters, the method proceeds directly to step 574, where agent 36 interacts with formerly unidentified customer 510 in some suitable manner at the point of sale according to the needs of the customer and the nature of the establishment. If a figure of merit has been provided at step 570, but is not deemed acceptable at step 572, agent 36 may interactively verify the identity of formerly unidentified customer 510 using conventional techniques at step 576.

Whether or not a figure of merit is provided at step 570 or deemed acceptable at step 572, processing system 502 or agent 36 may prompt formerly unidentified customer 510 at step 584 to provide a PIN, password, or other suitable identifier to authorize one or more transactions formerly unidentified customer 510 is trying to complete. For example, processing system 502 or agent 36 may require formerly unidentified customer 510 to enter a PIN, either manually or verbally, to authorize purchases that exceed a predetermined price threshold or include particular items. At step 586, processing system 502 or agent 36 compares the provided PIN with a PIN previously stored in one or more records 44 in database 42 to authorize the purchases. A PIN, password, or other suitable identifier may be required for all transactions or particular types of transactions according to particular needs.

In one embodiment, if a match is made at step 562, whether or not a figure of merit is calculated or deemed acceptable, processing system 502 or agent 36 may also prompt formerly unidentified customer 510 to provide a security utterance at step 588, such as the current time or date, that processing system 502 uses to provide further security and prevent fraud. For example, after formerly unidentified customer 510 has provided the current date as requested, processing system 502 uses speech recognition capability 23 to convert the security utterance to a form suitable for comparison at step 590 with time and date information that computer 50 maintains and updates more or less continuously during normal processing. If the current date that formerly unidentified customer 510 provided is correct at step 592, it is much less likely that a person has simply previously recorded an utterance of formerly unidentified customer 510 and used this recorded utterance in an attempt to fraudulently obtain a good, service, or other benefit using system 500. If the security utterance is not acceptable at step 592, agent 36 may interact with formerly unidentified customer 510 as appropriate to verify the identification of formerly unidentified customer 510 as the known customer to reduce or eliminate the potential for fraud.

In addition to verifying the accuracy of the provided security utterance, processing system 502 may compare the security utterance with stored utterance data 162 for formerly unidentified customer 510 in order to verify the identification made at step 562 using the techniques discussed above. In one embodiment, a time or date such as described for the security utterance is the utterance prompted at step 550 and provided at step 552 for initially identifying unidentified customer 510 from among a universe of known customers, which provides additional security over an utterance, for example, that contains only the name of unidentified customer 510.

The present invention also provides further security over previous systems, such as an ATM that requires users to input a magnetic card, because voice characteristics may change during an attempted robbery to the extent that no match can be made at step 562 and no good, service, or other benefit is provided. Processing system 502 may also use speech recognition facility 23 to recognize one or more predetermined distress, maintenance, or other utterances that prompt processing system 502 to alert or summon law enforcement authorities, maintenance personnel, or other appropriate persons or devices. Other security measures, including the use of ambiguity-resolution criteria to verify an identification, may be used without departing from the intended scope of the present invention. After agent 36 interacts with customer 510 in some suitable manner at step 574, for example, to provide a good, service, or other benefit, or to decline to provide a good, service, or other benefit, the method ends.

If processing system 502 is unable to match or suitably correlate the digitized utterance for unidentified customer 510 with an utterance identifier 164 corresponding to a known customer at step 562, or is unable to resolve an ambiguous identification at steps 565 and 566, agent 36 may interactively verify the identity of unidentified customer 510 according to conventional techniques at step 578. In one embodiment, the present invention is self-learning, such that if no match has been made at step 562 and unidentified customer 510 is identified interactively at step 578, system 500 may receive and store information for unidentified customer 510 for use in identifying one or more subsequent unidentified customers 510. For example, database 42 may not contain utterance data 162 to identify a particular unidentified customer 510 when unidentified customer 510 visits the establishment, for example, because unidentified customer 510 may have had no prior interaction with the establishment. Furthermore, database 42 may not yet contain utterance data 162 for any known customers, due to the length of time system 500 has been operating or for any other reason.

At step 580, processing system 502 may create a record 44 for formerly unidentified customer 510 containing an utterance identifier 164 and other utterance data 162 generated using the utterance provided at step 552. At step 582, the created record 44 for formerly unidentified customer 510 may be stored in one or more tables 160 within database 42 to register formerly unidentified customer 510 with system 500. The created record 44 for the formerly unidentified customer 510 may be associated with identity data 104, order data 132, or utterance data 162; banking, purchase, or account data; or any other appropriate information concerning formerly unidentified customer 510, such as purchasing information, whether the information is generated before, during, or after record 44 is created. In one embodiment, the created record 44 will correspond to a known customer for purposes of identifying subsequent unidentified customers 510 from among a universe of known customers at the point of sale. Before, during, or after storing the created record 44 at step 582, agent 36 interacts with formerly unidentified customer 510 in some suitable manner at step 574, for example, to provide a good, service, or other benefit, or to decline to provide a good, service, or other benefit if appropriate, and the method ends.

Although callers are discussed with reference to FIGS. 1 through 8*b* and customers are discussed with reference to FIGS. 9 and 10, callers and customers may be collectively referred to as persons. References to persons are intended to include all such callers and customers. The present invention contemplates the use of one or more suitable ambiguity-resolution criteria for resolving an ambiguous identification of an unidentified person as two or more known persons, or for verifying an unambiguous identification of an unidentified person as a particular known person, in any of the ways discussed above.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A self-learning caller authentication system for building a database of known persons with access to one or more secured resources comprising:
   storage for voiceprint identification data;
   storage for verification data; and
   a processing system configured to
      receive spoken identification information spoken in a current call initiated by a currently unidentified caller,
      receive verification information from the current call that is independent of the spoken identification information,
      generate a voiceprint associated with the currently unidentified caller from the spoken identification information,
      automatically compare the voiceprint associated with the currently unidentified caller with the voiceprint identification data stored in the voiceprint identification data storage to search for a voiceprint match with at least one of a plurality of known persons, one or more voiceprint matches, if found, signifying positive identification of the currently unidentified caller as at least one of the plurality of known persons, and a single voiceprint match, if found, signifying positive identification of the currently unidentified caller as a particular one of the plurality of known persons, with one or more voiceprint matches found identifying the currently unidentified caller as a now identified caller,
      if one or more voiceprint matches are found by automatically comparing the voiceprint with the voiceprint identification data, automatically compare the verification information with the verification data stored in the verification data storage for the at least one of the plurality of known persons to search for a verification data match with a particular one of the plurality of known persons, a single verification data match, if found, signifying positive verification of the now identified caller and verifying the now identified caller as a now identified and verified caller,
      if the currently unidentified caller is determined to be a now identified and verified caller by automatically comparing the verification information, authenticate the now identified and verified caller for access to the one or more secured resources, and
      if the currently unidentified caller is not determined to be a now identified and verified caller by automatically comparing the verification information, allow interaction with the currently unidentified caller to separately verify the identity of the currently unidentified caller, and
         if the currently unidentified caller is verified as a now identified and verified caller,
            automatically add the voiceprint and the verification information associated with the now identified and verified caller to the voiceprint identification data storage and the verification data storage, respectively, and
            authenticate the now identified and verified caller for access to the one or more secured resources.

2. The self-learning caller authentication system of claim 1, wherein the processing system includes an agent that allows the interaction with the currently unidentified caller to separately verify the identity of the currently unidentified caller.

3. The self-learning caller authentication system of claim 2, wherein the agent is autonomous.

4. The self-learning caller authentication system of claim 3, wherein the agent is a logical entity in hardware.

5. The self-learning caller authentication system of claim 3, wherein the agent is a logical entity in software.

6. The self-learning caller authentication system of claim 3, wherein the agent presents a called person with a screen on which the called person is provided with a list of those of the plurality of known persons who were determined as now identified callers but not determined as now identified and verified callers, the screen prompting the called person to select a person from the list, if any, as a now identified and verified caller.

7. The self-learning caller authentication system of claim 3, wherein the agent presents a called person with a screen on which the called person is prompted to type the identity of the currently unidentified caller to signify the currently unidentified caller as a now identified and verified caller.

8. The self-learning caller authentication system of claim 3, wherein the agent presents a called person with a screen on which the called person can forego the opportunity to indicate the currently unidentified caller as a now identified and verified caller.

9. The self-learning caller authentication system of claim 1, wherein the processing system that is configured to automatically add the voiceprint and the verification information associated with the now identified and verified caller to the voiceprint identification data storage and the verification data storage is configured to create a new record for the now identified and verified caller.

10. The self-learning caller authentication system of claim 1, wherein the processing system that is configured to automatically add the voiceprint and the verification information associated with the now identified and verified caller to the voiceprint identification data storage and the verification data storage is configured to add an existing record for the now identified and verified caller.

11. The self-learning caller authentication system of claim 1, wherein if no voiceprint matches are found after automatically comparing the voiceprint associated with the currently unidentified caller with voiceprint identification data stored in the voiceprint identification data storage, the processing system is configured to prompt the currently unidentified caller to provide further spoken identification information from which another voiceprint is generated and compared with the voiceprint identification data stored in the voiceprint identification data storage.

12. A method for authenticating a caller and automatically building a database of known persons with access to one or more secured resources comprising:
  receiving spoken identification information spoken in a current call initiated by a currently unidentified caller;
  receiving verification information from the current call that is independent of the spoken identification information;
  generating a voiceprint associated with the currently unidentified caller from the spoken identification information;
  receiving stored voiceprint identification data that was stored during system enrollment of a plurality of known persons;
  automatically comparing the voiceprint associated with the currently unidentified caller with the stored voiceprint identification data to search for a voiceprint match with at least one of the plurality of known persons, one or more voiceprint matches, if found, signifying positive identification of the currently unidentified caller as at least one of the plurality of known persons, and a single voiceprint match, if found, signifying positive identification of the currently unidentified caller as a particular one of the plurality of known persons, with one or more voiceprint matches found identifying the currently unidentified caller as a now identified caller;
  receiving stored verification data that was stored during the system enrollment of the plurality of known persons;
  if one or more voiceprint matches are found by automatically comparing the voiceprint with the stored voiceprint identification data, automatically comparing the verification information with the stored verification data for the at least one of the plurality of known persons to search for a verification data match with a particular one of the plurality of known persons, a single verification data match, if found, signifying positive verification of the now identified caller and verifying the now identified caller as a now identified and verified caller;
  if the currently unidentified caller is determined to be a now identified and verified caller by automatically comparing the verification information, authenticating the now identified and verified caller for access to the one or more secured resources; and
  if the currently unidentified caller is not determined to be a now identified and verified caller by automatically comparing the verification information,
    interacting with the currently unidentified caller to identify and verify the currently unidentified caller as a now identified and verified caller, and
    if the currently unidentified caller is identified and verified as a now identified and verified caller by interacting,
      automatically adding the voiceprint and the verification information associated with the now identified and verified caller to the stored voiceprint identification data and the stored verification data, respectively, and
      authenticating the now identified and verified caller for access to the one or more secured resources.

13. The method of claim 12, wherein the interacting with the currently unidentified caller comprises interacting by an agent.

14. The method of claim 13, wherein the interacting by the agent is autonomous interacting.

15. The method of claim 14, wherein the autonomous interacting by the agent is interacting as a logical entity in hardware.

16. The method of claim 14, wherein the autonomous interacting by the agent is interacting as a logical entity in software.

17. The method of claim 14, wherein the autonomous interacting comprises:
  presenting a called person with a screen on which the called person is provided with a list of those of the plurality of known persons who were determined as now identified callers but not determined as now identified and verified callers; and
  prompting the called person to select a person from the list, if any, as a now identified and verified caller.

18. The method of claim 14, wherein the autonomous interacting comprises:
  presenting a called person with a screen on which the called person is prompted to type the identity of the currently unidentified caller to signify the currently unidentified caller as a now identified and verified caller.

19. The method of claim 14, wherein the autonomous interacting comprises:
presenting a called person with a screen on which the called person can forego an opportunity to indicate the currently unidentified caller as a now identified and verified caller.

20. The method of claim 13, wherein the interacting by the agent is interacting by a person.

21. The method of claim 12, wherein the automatically adding the voiceprint and the verification information associated with the now identified and verified caller to the stored voiceprint identification data and the stored verification data comprises:
creating a new record for the now identified and verified caller.

22. The method of claim 12, wherein the automatically adding the voiceprint and the verification information associated with the now identified and verified caller to the stored voiceprint identification data and the stored verification data comprises:
adding to an existing record for the now identified and verified caller.

23. The method of claim 12, wherein if no voiceprint matches are found after automatically comparing the voiceprint associated with the currently unidentified caller with the stored voiceprint identification data, prompting the currently unidentified caller to provide further spoken identification information from which another voiceprint can be generated and compared with the stored voiceprint identification data.

24. Software for authenticating a caller and automatically building a database of known persons with access to one or more secured resources, the software being embodied in tangible computer-readable media and operable to:
receive spoken identification information spoken in a current call initiated by a currently unidentified caller;
receive verification information from the current call that is independent of the spoken identification information;
generate a voiceprint associated with the currently unidentified caller from the spoken identification information;
receive stored voiceprint identification data that was stored during system enrollment of a plurality of known persons;
automatically compare the voiceprint associated with the currently unidentified caller with the stored voiceprint identification data to search for a voiceprint match with at least one of the plurality of known persons, one or more voiceprint matches, if found, signifying positive identification of the currently unidentified caller as at least one of the plurality of known persons, and a single voiceprint match, if found, signifying positive identification of the currently unidentified caller as a particular one of the plurality of known persons, with one or more voiceprint matches found identifying the currently unidentified caller as a now identified caller;
receive stored verification data that was stored during the system enrollment of the plurality of known persons;
if one or more voiceprint matches are found by automatically comparing the voiceprint with the stored voiceprint identification data, automatically compare the verification information with the stored verification data for the at least one of the plurality of known persons to search for a verification data match with a particular one of the plurality of known persons, a single verification data match, if found, signifying positive verification of the now identified caller and verifying the now identified caller as a now identified and verified caller;
if the currently unidentified caller is determined to be a now identified and verified caller by automatically comparing the verification information, authenticate the now identified and verified caller for access to the one or more secured resources; and
if the currently unidentified caller is not determined to be a now identified and verified caller by automatically comparing the verification information,
interact with the currently unidentified caller to identify and verify the currently unidentified caller as a now identified and verified caller, and
if the currently unidentified caller is identified and verified as a now identified and verified caller by the interaction,
automatically add the voiceprint and the verification information associated with the now identified and verified caller to the stored voiceprint identification data and the stored verification data, respectively, and
authenticate the now identified and verified caller for access to the one or more secured resources.

* * * * *